United States Patent
Dettmann et al.

(10) Patent No.: US 12,442,823 B2
(45) Date of Patent: Oct. 14, 2025

(54) METHOD AND REAGENTS FOR DIAGNOSING MEMBRANOUS NEPHROPATHY

(71) Applicant: EUROIMMUN Medizinische Labordiagnostika AG, Luebeck (DE)

(72) Inventors: Inga-Madeleine Dettmann, Ahrensboek (DE); Swantje Mindorf, Ziethen (DE); Christian Probst, Ratzeburg (DE)

(73) Assignee: EUROIMMUN Medizinische Labordiagnostika AG, Luebeck (DE)

( * ) Notice: Subject to any disclaimer, the term of this patent is extended or adjusted under 35 U.S.C. 154(b) by 540 days.

(21) Appl. No.: 17/457,279

(22) Filed: Dec. 2, 2021

(65) Prior Publication Data

US 2022/0187320 A1    Jun. 16, 2022
US 2023/0213534 A9    Jul. 6, 2023

(30) Foreign Application Priority Data

Dec. 11, 2020 (EP) .................... 20213450

(51) Int. Cl.
G01N 33/68 (2006.01)
G01N 33/564 (2006.01)

(52) U.S. Cl.
CPC ....... *G01N 33/6893* (2013.01); *G01N 33/564* (2013.01); *G01N 33/6857* (2013.01); *G01N 2800/347* (2013.01)

(58) Field of Classification Search
None
See application file for complete search history.

(56) References Cited

U.S. PATENT DOCUMENTS

2006/0040293 A1    2/2006    Salonen et al.

FOREIGN PATENT DOCUMENTS

| CN | 101209578 B | * | 9/2011 | |
|---|---|---|---|---|
| WO | WO-2015128671 A1 | * | 9/2015 | .............. A61P 15/00 |
| WO | 2020/037135 | | 2/2020 | |
| WO | WO-2021055767 A1 | * | 3/2021 | ........... A61K 31/196 |

OTHER PUBLICATIONS

Sethi JASN 32: 268-278, 2021. doi: https://doi.org/10.1681/ASN.2020071082 (Year: 2021).*
Saidi et al. Kidney Int Rep (2021) 6, 1977-1980; https://doi.org/10.1016/j.ekir.2021.04.025 (Year: 2021).*
Zane, Hannah. D; "Immunology: Theoretical & Practical Concepts in Laboratory Medicine", Philadelphia, PA, W. B. Saunders Company, 2001, pp. 149 and 185.
K. Michael Pollard (ed.), chapter 8 "Detection of Autoantibodies", subchapter 8.1 "Comparison of Common Techniques" in Autoantibodies and Autoimmunity, Wiley-VCH 2006, 2006, pp. 159-164.
Adam et al., "*The Molecular Pathology of Immune Checkpoint Inhibitor-Induced Acute Kidney Injury: Overlap between Native and Transplant Phenotypes*", USCAP Abstracts, Medical Renal Pathology (Including Transplantation), 2019, pp. 1581-1620.
Anders et al., "*Nephropathic autoantigens in the spectrum of lupus nephritis*", Nature Reviews, Nephrology, vol. 15, Oct. 2019, pp. 595-596.
Bertelli et al., "*Molecular and Cellular Mechanisms for Proteinuria and Minimal Change Disease*", Frontiers in Medicine, vol. 5, Article 170, Jun. 2018, pp. 1-13.
Jackeline Gosink, "*Multiparametric serological testing in autoimmune encephalitis*", EUROIMMUN AG, Luebeck, Germany, Jun. 12, 2019, pp. 1-5.
Saschenbrecker et al., "*Serological Diagnosis of Autoimmune Bullous Skin Diseases*", Frontiers in Immunology, vol. 10, Article 1974, Aug. 2019, pp. 1-18.
Senay et al., "*The EXT1/EXT2 tumor suppressors: catalytic activities and role in heparan sulfate biosynthesis*", EMBO reports, vol. 1, No. 3, 2000, pp. 282-286.
Sethi et al., "*Exostosin 1/Exostosin 2-Associated Membranous Nephropathy*", Clinical Research, vol. 30, 2019, pp. 1123-1136.

* cited by examiner

*Primary Examiner* — Gregory S Emch
*Assistant Examiner* — Fernando Ivich
(74) *Attorney, Agent, or Firm* — Grüneberg and Myers PLLC

(57) ABSTRACT

Provided are a diagnostically useful carrier coated with a recombinant polypeptide comprising SEQ ID NO: 1, an isolated autoantibody binding specifically to a polypeptide having SEQ ID NO: 1, a kit comprising the carrier, a method for the diagnosis of a membranous nephropathy (MN) that includes detecting the presence or absence of an autoantibody binding specifically to a polypeptide having SEQ ID NO: 1 in a liquid sample comprising antibodies from a subject, a use of an autoantibody binding specifically to a polypeptide having SEQ ID NO: 1 or a polypeptide comprising SEQ ID NO: 1, and a aqueous solution comprising an autoantibody binding specifically to a polypeptide having SEQ ID NO: 1.

14 Claims, 3 Drawing Sheets

Specification includes a Sequence Listing.

SEQUENCE LISTING

```
<160> NUMBER OF SEQ ID NOS: 10

<210> SEQ ID NO 1
<211> LENGTH: 718
<212> TYPE: PRT
<213> ORGANISM: Homo sapiens

<400> SEQUENCE: 1

Met Cys Ala Ser Val Lys Tyr Asn Ile Arg Gly Pro Ala Leu Ile Pro
1               5                   10                  15

Arg Met Lys Thr Lys His Arg Ile Tyr Tyr Ile Thr Leu Phe Ser Ile
            20                  25                  30

Val Leu Leu Gly Leu Ile Ala Thr Gly Met Phe Gln Phe Trp Pro His
        35                  40                  45

Ser Ile Glu Ser Ser Asn Asp Trp Asn Val Glu Lys Arg Ser Ile Arg
    50                  55                  60

Asp Val Pro Val Val Arg Leu Pro Ala Asp Ser Pro Ile Pro Glu Arg
65                  70                  75                  80

Gly Asp Leu Ser Cys Arg Met His Thr Cys Phe Asp Val Tyr Arg Cys
                85                  90                  95

Gly Phe Asn Pro Lys Asn Lys Ile Lys Val Tyr Ile Tyr Ala Leu Lys
            100                 105                 110

Lys Tyr Val Asp Asp Phe Gly Val Ser Val Ser Asn Thr Ile Ser Arg
        115                 120                 125

Glu Tyr Asn Glu Leu Leu Met Ala Ile Ser Asp Ser Asp Tyr Tyr Thr
    130                 135                 140

Asp Asp Ile Asn Arg Ala Cys Leu Phe Val Pro Ser Ile Asp Val Leu
145                 150                 155                 160

Asn Gln Asn Thr Leu Arg Ile Lys Glu Thr Ala Gln Ala Met Ala Gln
                165                 170                 175
```

```
Leu Ser Arg Trp Asp Arg Gly Thr Asn His Leu Leu Phe Asn Met Leu
            180                 185                 190

Pro Gly Gly Pro Pro Asp Tyr Asn Thr Ala Leu Asp Val Pro Arg Asp
        195                 200                 205

Arg Ala Leu Leu Ala Gly Gly Gly Phe Ser Thr Trp Thr Tyr Arg Gln
    210                 215                 220

Gly Tyr Asp Val Ser Ile Pro Val Tyr Ser Pro Leu Ser Ala Glu Val
225                 230                 235                 240

Asp Leu Pro Glu Lys Gly Pro Gly Pro Arg Gln Tyr Phe Leu Leu Ser
                245                 250                 255

Ser Gln Val Gly Leu His Pro Glu Tyr Arg Glu Asp Leu Glu Ala Leu
            260                 265                 270

Gln Val Lys His Gly Glu Ser Val Leu Val Leu Asp Lys Cys Thr Asn
        275                 280                 285

Leu Ser Glu Gly Val Leu Ser Val Arg Lys Arg Cys His Lys His Gln
    290                 295                 300

Val Phe Asp Tyr Pro Gln Val Leu Gln Glu Ala Thr Phe Cys Val Val
305                 310                 315                 320

Leu Arg Gly Ala Arg Leu Gly Gln Ala Val Leu Ser Asp Val Leu Gln
                325                 330                 335

Ala Gly Cys Val Pro Val Ile Ala Asp Ser Tyr Ile Leu Pro Phe
            340                 345                 350

Ser Glu Val Leu Asp Trp Lys Arg Ala Ser Val Val Pro Glu Glu
        355                 360                 365

Lys Met Ser Asp Val Tyr Ser Ile Leu Gln Ser Ile Pro Gln Arg Gln
370                 375                 380

Ile Glu Glu Met Gln Arg Gln Ala Arg Trp Phe Trp Glu Ala Tyr Phe
385                 390                 395                 400

Gln Ser Ile Lys Ala Ile Ala Leu Ala Thr Leu Gln Ile Ile Asn Asp
                405                 410                 415

Arg Ile Tyr Pro Tyr Ala Ala Ile Ser Tyr Glu Glu Trp Asn Asp Pro
            420                 425                 430

Pro Ala Val Lys Trp Gly Ser Val Ser Asn Pro Leu Phe Leu Pro Leu
        435                 440                 445

Ile Pro Pro Gln Ser Gln Gly Phe Thr Ala Ile Val Leu Thr Tyr Asp
    450                 455                 460

Arg Val Glu Ser Leu Phe Arg Val Ile Thr Glu Val Ser Lys Val Pro
465                 470                 475                 480

Ser Leu Ser Lys Leu Leu Val Val Trp Asn Asn Gln Asn Lys Asn Pro
                485                 490                 495

Pro Glu Asp Ser Leu Trp Pro Lys Ile Arg Val Pro Leu Lys Val Val
            500                 505                 510

Arg Thr Ala Glu Asn Lys Leu Ser Asn Arg Phe Phe Pro Tyr Asp Glu
        515                 520                 525

Ile Glu Thr Glu Ala Val Leu Ala Ile Asp Asp Ile Ile Met Leu
    530                 535                 540

Thr Ser Asp Glu Leu Gln Phe Gly Tyr Glu Val Trp Arg Glu Phe Pro
545                 550                 555                 560

Asp Arg Leu Val Gly Tyr Pro Gly Arg Leu His Leu Trp Asp His Glu
                565                 570                 575

Met Asn Lys Trp Lys Tyr Glu Ser Glu Trp Thr Asn Glu Val Ser Met
            580                 585                 590

Val Leu Thr Gly Ala Ala Phe Tyr His Lys Tyr Phe Asn Tyr Leu Tyr
```

```
                595                 600                 605
Thr Tyr Lys Met Pro Gly Asp Ile Lys Asn Trp Val Asp Ala His Met
610                     615                 620

Asn Cys Glu Asp Ile Ala Met Asn Phe Leu Val Ala Asn Val Thr Gly
625                 630                  635                 640

Lys Ala Val Ile Lys Val Thr Pro Arg Lys Phe Lys Cys Pro Glu
                645                 650                 655

Cys Thr Ala Ile Asp Gly Leu Ser Leu Asp Gln Thr His Met Val Glu
                660                 665                 670

Arg Ser Glu Cys Ile Asn Lys Phe Ala Ser Val Phe Gly Thr Met Pro
            675                 680                 685

Leu Lys Val Val Glu His Arg Ala Asp Pro Val Leu Tyr Lys Asp Asp
                690                 695                 700

Phe Pro Glu Lys Leu Lys Ser Phe Pro Asn Ile Gly Ser Leu
705                 710                 715

<210> SEQ ID NO 2
<211> LENGTH: 746
<212> TYPE: PRT
<213> ORGANISM: Homo sapiens

<400> SEQUENCE: 2

Met Gln Ala Lys Lys Arg Tyr Phe Ile Leu Leu Ser Ala Gly Ser Cys
1               5                   10                  15

Leu Ala Leu Leu Phe Tyr Phe Gly Gly Leu Gln Phe Arg Ala Ser Arg
                20                  25                  30

Ser His Ser Arg Arg Glu Glu His Ser Gly Arg Asn Gly Leu His His
            35                  40                  45

Pro Ser Pro Asp His Phe Trp Pro Arg Phe Pro Asp Ala Leu Arg Pro
        50                  55                  60

Phe Val Pro Trp Asp Gln Leu Glu Asn Glu Asp Ser Ser Val His Ile
65                  70                  75                  80

Ser Pro Arg Gln Lys Arg Asp Ala Asn Ser Ser Ile Tyr Lys Gly Lys
                85                  90                  95

Lys Cys Arg Met Glu Ser Cys Phe Asp Phe Thr Leu Cys Lys Lys Asn
                100                 105                 110

Gly Phe Lys Val Tyr Val Tyr Pro Gln Gln Lys Gly Glu Lys Ile Ala
            115                 120                 125

Glu Ser Tyr Gln Asn Ile Leu Ala Ala Ile Glu Gly Ser Arg Phe Tyr
130                 135                 140

Thr Ser Asp Pro Ser Gln Ala Cys Leu Phe Val Leu Ser Leu Asp Thr
145                 150                 155                 160

Leu Asp Arg Asp Gln Leu Ser Pro Gln Tyr Val His Asn Leu Arg Ser
                165                 170                 175

Lys Val Gln Ser Leu His Leu Trp Asn Asn Gly Arg Asn His Leu Ile
                180                 185                 190

Phe Asn Leu Tyr Ser Gly Thr Trp Pro Asp Tyr Thr Glu Asp Val Gly
            195                 200                 205

Phe Asp Ile Gly Gln Ala Met Leu Ala Lys Ala Ser Ile Ser Thr Glu
210                 215                 220

Asn Phe Arg Pro Asn Phe Asp Val Ser Ile Pro Leu Phe Ser Lys Asp
225                 230                 235                 240

His Pro Arg Thr Gly Gly Glu Arg Gly Phe Leu Lys Phe Asn Thr Ile
                245                 250                 255
```

```
Pro Pro Leu Arg Lys Tyr Met Leu Val Phe Lys Gly Lys Arg Tyr Leu
            260                 265                 270

Thr Gly Ile Gly Ser Asp Thr Arg Asn Ala Leu Tyr His Val His Asn
        275                 280                 285

Gly Glu Asp Val Val Leu Leu Thr Thr Cys Lys His Gly Lys Asp Trp
    290                 295                 300

Gln Lys His Lys Asp Ser Arg Cys Asp Arg Asp Asn Thr Glu Tyr Glu
305                 310                 315                 320

Lys Tyr Asp Tyr Arg Glu Met Leu His Asn Ala Thr Phe Cys Leu Val
                325                 330                 335

Pro Arg Gly Arg Arg Leu Gly Ser Phe Arg Phe Leu Glu Ala Leu Gln
            340                 345                 350

Ala Ala Cys Val Pro Val Met Leu Ser Asn Gly Trp Glu Leu Pro Phe
        355                 360                 365

Ser Glu Val Ile Asn Trp Asn Gln Ala Ala Val Ile Gly Asp Glu Arg
    370                 375                 380

Leu Leu Leu Gln Ile Pro Ser Thr Ile Arg Ser Ile His Gln Asp Lys
385                 390                 395                 400

Ile Leu Ala Leu Arg Gln Gln Thr Gln Phe Leu Trp Glu Ala Tyr Phe
                405                 410                 415

Ser Ser Val Glu Lys Ile Val Leu Thr Thr Leu Glu Ile Ile Gln Asp
            420                 425                 430

Arg Ile Phe Lys His Ile Ser Arg Asn Ser Leu Ile Trp Asn Lys His
        435                 440                 445

Pro Gly Gly Leu Phe Val Leu Pro Gln Tyr Ser Ser Tyr Leu Gly Asp
    450                 455                 460

Phe Pro Tyr Tyr Tyr Ala Asn Leu Gly Leu Lys Pro Pro Ser Lys Phe
465                 470                 475                 480

Thr Ala Val Ile His Ala Val Thr Pro Leu Val Ser Gln Ser Gln Pro
                485                 490                 495

Val Leu Lys Leu Leu Val Ala Ala Lys Ser Gln Tyr Cys Ala Gln
            500                 505                 510

Ile Ile Val Leu Trp Asn Cys Asp Lys Pro Leu Pro Ala Lys His Arg
        515                 520                 525

Trp Pro Ala Thr Ala Val Pro Val Val Ile Glu Gly Glu Ser Lys
    530                 535                 540

Val Met Ser Ser Arg Phe Leu Pro Tyr Asp Asn Ile Ile Thr Asp Ala
545                 550                 555                 560

Val Leu Ser Leu Asp Glu Asp Thr Val Leu Ser Thr Thr Glu Val Asp
                565                 570                 575

Phe Ala Phe Thr Val Trp Gln Ser Phe Pro Glu Arg Ile Val Gly Tyr
            580                 585                 590

Pro Ala Arg Ser His Phe Trp Asp Asn Ser Lys Glu Arg Trp Gly Tyr
        595                 600                 605

Thr Ser Lys Trp Thr Asn Asp Tyr Ser Met Val Leu Thr Gly Ala Ala
    610                 615                 620

Ile Tyr His Lys Tyr Tyr His Tyr Leu Tyr Ser His Tyr Leu Pro Ala
625                 630                 635                 640

Ser Leu Lys Asn Met Val Asp Gln Leu Ala Asn Cys Glu Asp Ile Leu
                645                 650                 655

Met Asn Phe Leu Val Ser Ala Val Thr Lys Leu Pro Pro Ile Lys Val
            660                 665                 670

Thr Gln Lys Lys Gln Tyr Lys Glu Thr Met Met Gly Gln Thr Ser Arg
```

```
                675                 680                 685
Ala Ser Arg Trp Ala Asp Pro Asp His Phe Ala Gln Arg Gln Ser Cys
    690                 695                 700

Met Asn Thr Phe Ala Ser Trp Phe Gly Tyr Met Pro Leu Ile His Ser
705                 710                 715                 720

Gln Met Arg Leu Asp Pro Val Leu Phe Lys Asp Gln Val Ser Ile Leu
                725                 730                 735

Arg Lys Lys Tyr Arg Asp Ile Glu Arg Leu
            740                 745

<210> SEQ ID NO 3
<211> LENGTH: 1463
<212> TYPE: PRT
<213> ORGANISM: Homo sapiens

<400> SEQUENCE: 3

Met Leu Leu Ser Pro Ser Leu Leu Leu Leu Leu Gly Ala Pro
1               5                   10                  15

Arg Gly Cys Ala Glu Gly Val Ala Ala Leu Thr Pro Glu Arg Leu
            20                  25                  30

Leu Glu Trp Gln Asp Lys Gly Ile Phe Val Ile Gln Ser Glu Ser Leu
            35                  40                  45

Lys Lys Cys Ile Gln Ala Gly Lys Ser Val Leu Thr Leu Glu Asn Cys
50                  55                  60

Lys Gln Ala Asn Lys His Met Leu Trp Lys Trp Val Ser Asn His Gly
65                  70                  75                  80

Leu Phe Asn Ile Gly Gly Ser Gly Cys Leu Gly Leu Asn Phe Ser Ala
                85                  90                  95

Pro Glu Gln Pro Leu Ser Leu Tyr Glu Cys Asp Ser Thr Leu Val Ser
            100                 105                 110

Leu Arg Trp Arg Cys Asn Arg Lys Met Ile Thr Gly Pro Leu Gln Tyr
            115                 120                 125

Ser Val Gln Val Ala His Asp Asn Thr Val Val Ala Ser Arg Lys Tyr
        130                 135                 140

Ile His Lys Trp Ile Ser Tyr Gly Ser Gly Gly Gly Asp Ile Cys Glu
145                 150                 155                 160

Tyr Leu His Lys Asp Leu His Thr Ile Lys Gly Asn Thr His Gly Met
                165                 170                 175

Pro Cys Met Phe Pro Phe Gln Tyr Asn His Gln Trp His His Glu Cys
            180                 185                 190

Thr Arg Glu Gly Arg Glu Asp Asp Leu Leu Trp Cys Ala Thr Thr Ser
        195                 200                 205

Arg Tyr Glu Arg Asp Glu Lys Trp Gly Phe Cys Pro Asp Pro Thr Ser
    210                 215                 220

Ala Glu Val Gly Cys Asp Thr Ile Trp Glu Lys Asp Leu Asn Ser His
225                 230                 235                 240

Ile Cys Tyr Gln Phe Asn Leu Leu Ser Ser Leu Ser Trp Ser Glu Ala
                245                 250                 255

His Ser Ser Cys Gln Met Gln Gly Gly Thr Leu Leu Ser Ile Thr Asp
            260                 265                 270

Glu Thr Glu Glu Asn Phe Ile Arg Glu His Met Ser Ser Lys Thr Val
        275                 280                 285

Glu Val Trp Met Gly Leu Asn Gln Leu Asp Glu His Ala Gly Trp Gln
    290                 295                 300
```

```
Trp Ser Asp Gly Thr Pro Leu Asn Tyr Leu Asn Trp Ser Pro Glu Val
305                 310                 315                 320

Asn Phe Glu Pro Phe Val Glu Asp His Cys Gly Thr Phe Ser Ser Phe
            325                 330                 335

Met Pro Ser Ala Trp Arg Ser Arg Asp Cys Glu Ser Thr Leu Pro Tyr
        340                 345                 350

Ile Cys Lys Lys Tyr Leu Asn His Ile Asp His Glu Ile Val Glu Lys
                355                 360                 365

Asp Ala Trp Lys Tyr Tyr Ala Thr His Cys Glu Pro Gly Trp Asn Pro
    370                 375                 380

Tyr Asn Arg Asn Cys Tyr Lys Leu Gln Lys Glu Lys Thr Trp His
385                 390                 395                 400

Glu Ala Leu Arg Ser Cys Gln Ala Asp Asn Ser Ala Leu Ile Asp Ile
                405                 410                 415

Thr Ser Leu Ala Glu Val Glu Phe Leu Val Thr Leu Leu Gly Asp Glu
            420                 425                 430

Asn Ala Ser Glu Thr Trp Ile Gly Leu Ser Ser Asn Lys Ile Pro Val
        435                 440                 445

Ser Phe Glu Trp Ser Asn Asp Ser Ser Val Ile Phe Thr Asn Trp His
    450                 455                 460

Thr Leu Glu Pro His Ile Phe Pro Asn Arg Ser Gln Leu Cys Val Ser
465                 470                 475                 480

Ala Glu Gln Ser Glu Gly His Trp Lys Val Lys Asn Cys Glu Glu Arg
                485                 490                 495

Leu Phe Tyr Ile Cys Lys Lys Ala Gly His Val Leu Ser Asp Ala Glu
            500                 505                 510

Ser Gly Cys Gln Glu Gly Trp Glu Arg His Gly Gly Phe Cys Tyr Lys
        515                 520                 525

Ile Asp Thr Val Leu Arg Ser Phe Asp Gln Ala Ser Ser Gly Tyr Tyr
    530                 535                 540

Cys Pro Pro Ala Leu Val Thr Ile Thr Asn Arg Phe Glu Gln Ala Phe
545                 550                 555                 560

Ile Thr Ser Leu Ile Ser Ser Val Val Lys Met Lys Asp Ser Tyr Phe
                565                 570                 575

Trp Ile Ala Leu Gln Asp Gln Asn Asp Thr Gly Glu Tyr Thr Trp Lys
            580                 585                 590

Pro Val Gly Gln Lys Pro Glu Pro Val Gln Tyr Thr His Trp Asn Thr
        595                 600                 605

His Gln Pro Arg Tyr Ser Gly Gly Cys Val Ala Met Arg Gly Arg His
    610                 615                 620

Pro Leu Gly Arg Trp Glu Val Lys His Cys Arg His Phe Lys Ala Met
625                 630                 635                 640

Ser Leu Cys Lys Gln Pro Val Glu Asn Gln Glu Lys Ala Glu Tyr Glu
                645                 650                 655

Glu Arg Trp Pro Phe His Pro Cys Tyr Leu Asp Trp Glu Ser Glu Pro
            660                 665                 670

Gly Leu Ala Ser Cys Phe Lys Val Phe His Ser Glu Lys Val Leu Met
        675                 680                 685

Lys Arg Thr Trp Arg Glu Ala Glu Ala Phe Cys Glu Glu Phe Gly Ala
    690                 695                 700

His Leu Ala Ser Phe Ala His Ile Glu Glu Asn Phe Val Asn Glu
705                 710                 715                 720

Leu Leu His Ser Lys Phe Asn Trp Thr Glu Glu Arg Gln Phe Trp Ile
```

-continued

```
                725                 730                 735
Gly Phe Asn Lys Arg Asn Pro Leu Asn Ala Gly Ser Trp Glu Trp Ser
            740                 745                 750
Asp Arg Thr Pro Val Val Ser Ser Phe Leu Asp Asn Thr Tyr Phe Gly
            755                 760                 765
Glu Asp Ala Arg Asn Cys Ala Val Tyr Lys Ala Asn Lys Thr Leu Leu
            770                 775                 780
Pro Leu His Cys Gly Ser Lys Arg Glu Trp Ile Cys Lys Ile Pro Arg
785                 790                 795                 800
Asp Val Lys Pro Lys Ile Pro Phe Trp Tyr Gln Tyr Asp Val Pro Trp
                805                 810                 815
Leu Phe Tyr Gln Asp Ala Glu Tyr Leu Phe His Thr Phe Ala Ser Glu
            820                 825                 830
Trp Leu Asn Phe Glu Phe Val Cys Ser Trp Leu His Ser Asp Leu Leu
            835                 840                 845
Thr Ile His Ser Ala His Glu Gln Glu Phe Ile His Ser Lys Ile Lys
850                 855                 860
Ala Leu Ser Lys Tyr Gly Ala Ser Trp Trp Ile Gly Leu Gln Glu Glu
865                 870                 875                 880
Arg Ala Asn Asp Glu Phe Arg Trp Arg Asp Gly Thr Pro Val Ile Tyr
                885                 890                 895
Gln Asn Trp Asp Thr Gly Arg Glu Arg Thr Val Asn Asn Gln Ser Gln
                900                 905                 910
Arg Cys Gly Phe Ile Ser Ser Ile Thr Gly Leu Trp Gly Ser Glu Glu
            915                 920                 925
Cys Ser Val Ser Met Pro Ser Ile Cys Lys Arg Lys Lys Val Trp Leu
930                 935                 940
Ile Glu Lys Lys Lys Asp Thr Pro Lys Gln His Gly Thr Cys Pro Lys
945                 950                 955                 960
Gly Trp Leu Tyr Phe Asn Tyr Lys Cys Leu Leu Leu Asn Ile Pro Lys
                965                 970                 975
Asp Pro Ser Ser Trp Lys Asn Trp Thr His Ala Gln His Phe Cys Ala
            980                 985                 990
Glu Glu Gly Gly Thr Leu Val Ala  Ile Glu Ser Glu Val  Glu Gln Ala
            995                1000                1005
Phe Ile Thr Met Asn Leu Phe  Gly Gln Thr Thr Ser  Val Trp Ile
        1010                1015                1020
Gly Leu Gln Asn Asp Asp Tyr  Glu Thr Trp Leu Asn  Gly Lys Pro
        1025                1030                1035
Val Val  Tyr Ser Asn Trp Ser  Pro Phe Asp Ile Ile  Asn Ile Pro
        1040                1045                1050
Ser His  Asn Thr Thr Glu Val  Gln Lys His Ile Pro  Leu Cys Ala
        1055                1060                1065
Leu Leu Ser Ser Asn Pro Asn  Phe His Phe Thr Gly  Lys Trp Tyr
        1070                1075                1080
Phe Glu  Asp Cys Gly Lys Glu  Gly Tyr Gly Phe Val  Cys Glu Lys
        1085                1090                1095
Met Gln  Asp Thr Ser Gly His  Gly Val Asn Thr Ser  Asp Met Tyr
        1100                1105                1110
Pro Met  Pro Asn Thr Leu Glu  Tyr Gly Asn Arg Thr  Tyr Lys Ile
        1115                1120                1125
Ile Asn  Ala Asn Met Thr Trp  Tyr Ala Ala Ile Lys  Thr Cys Leu
        1130                1135                1140
```

```
Met His Lys Ala Gln Leu Val Ser Ile Thr Asp Gln Tyr His Gln
    1145                1150                1155

Ser Phe Leu Thr Val Val Leu Asn Arg Leu Gly Tyr Ala His Trp
    1160                1165                1170

Ile Gly Leu Phe Thr Thr Asp Asn Gly Leu Asn Phe Asp Trp Ser
    1175                1180                1185

Asp Gly Thr Lys Ser Ser Phe Thr Phe Trp Lys Asp Glu Glu Ser
    1190                1195                1200

Ser Leu Leu Gly Asp Cys Val Phe Ala Asp Ser Asn Gly Arg Trp
    1205                1210                1215

His Ser Thr Ala Cys Glu Ser Phe Leu Gln Gly Ala Ile Cys His
    1220                1225                1230

Val Pro Pro Glu Thr Arg Gln Ser Glu His Pro Glu Leu Cys Ser
    1235                1240                1245

Glu Thr Ser Ile Pro Trp Ile Lys Phe Lys Ser Asn Cys Tyr Ser
    1250                1255                1260

Phe Ser Thr Val Leu Asp Ser Met Ser Phe Glu Ala Ala His Glu
    1265                1270                1275

Phe Cys Lys Lys Glu Gly Ser Asn Leu Leu Thr Ile Lys Asp Glu
    1280                1285                1290

Ala Glu Asn Ala Phe Leu Leu Glu Glu Leu Phe Ala Phe Gly Ser
    1295                1300                1305

Ser Val Gln Met Val Trp Leu Asn Ala Gln Phe Asp Gly Asn Asn
    1310                1315                1320

Glu Thr Ile Lys Trp Phe Asp Gly Thr Pro Thr Asp Gln Ser Asn
    1325                1330                1335

Trp Gly Ile Arg Lys Pro Asp Thr Asp Tyr Phe Lys Pro His His
    1340                1345                1350

Cys Val Ala Leu Arg Ile Pro Glu Gly Leu Trp Gln Leu Ser Pro
    1355                1360                1365

Cys Gln Glu Lys Lys Gly Phe Ile Cys Lys Met Glu Ala Asp Ile
    1370                1375                1380

His Thr Ala Glu Ala Leu Pro Glu Lys Gly Pro Ser His Ser Ile
    1385                1390                1395

Ile Pro Leu Ala Val Val Leu Thr Leu Ile Val Ile Val Ala Ile
    1400                1405                1410

Cys Thr Leu Ser Phe Cys Ile Tyr Lys His Asn Gly Gly Phe Phe
    1415                1420                1425

Arg Arg Leu Ala Gly Phe Arg Asn Pro Tyr Tyr Pro Ala Thr Asn
    1430                1435                1440

Phe Ser Thr Val Tyr Leu Glu Glu Asn Ile Leu Ile Ser Asp Leu
    1445                1450                1455

Glu Lys Ser Asp Gln
    1460

<210> SEQ ID NO 4
<211> LENGTH: 1657
<212> TYPE: PRT
<213> ORGANISM: Homo sapiens

<400> SEQUENCE: 4

Met Gly Leu Gln Ala Arg Arg Trp Ala Ser Gly Ser Arg Gly Ala Ala
1               5                   10                  15

Gly Pro Arg Arg Gly Val Leu Gln Leu Leu Pro Leu Pro Leu Pro Leu
```

```
                20                  25                  30
Pro Leu Leu Leu Leu Leu Leu Arg Pro Gly Ala Gly Arg Ala Ala
            35                  40                  45
Ala Gln Gly Glu Ala Glu Ala Pro Thr Leu Tyr Leu Trp Lys Thr Gly
        50                  55                  60
Pro Trp Gly Arg Cys Met Gly Asp Glu Cys Gly Pro Gly Gly Ile Gln
65                      70                  75                  80
Thr Arg Ala Val Trp Cys Ala His Val Glu Gly Trp Thr Thr Leu His
                    85                  90                  95
Thr Asn Cys Lys Gln Ala Glu Arg Pro Asn Asn Gln Gln Asn Cys Phe
            100                 105                 110
Lys Val Cys Asp Trp His Lys Glu Leu Tyr Asp Trp Arg Leu Gly Pro
            115                 120                 125
Trp Asn Gln Cys Gln Pro Val Ile Ser Lys Ser Leu Glu Lys Pro Leu
        130                 135                 140
Glu Cys Ile Lys Gly Glu Gly Ile Gln Val Arg Glu Ile Ala Cys
145                 150                 155                 160
Ile Gln Lys Asp Lys Asp Ile Pro Ala Glu Asp Ile Ile Cys Glu Tyr
                165                 170                 175
Phe Glu Pro Lys Pro Leu Leu Glu Gln Ala Cys Leu Ile Pro Cys Gln
            180                 185                 190
Gln Asp Cys Ile Val Ser Glu Phe Ser Ala Trp Ser Gly Cys Ser Lys
        195                 200                 205
Thr Cys Gly Ser Gly Leu Gln His Arg Thr Arg His Val Val Ala Pro
    210                 215                 220
Pro Gln Phe Gly Gly Ser Gly Cys Pro Asn Leu Thr Glu Phe Gln Val
225                 230                 235                 240
Cys Gln Ser Ser Pro Cys Glu Ala Glu Glu Leu Arg Tyr Ser Leu His
                245                 250                 255
Val Gly Pro Trp Ser Thr Cys Ser Met Pro His Ser Arg Gln Val Arg
            260                 265                 270
Gln Ala Arg Arg Arg Gly Lys Asn Lys Glu Arg Glu Lys Asp Arg Ser
        275                 280                 285
Lys Gly Val Lys Asp Pro Glu Ala Arg Glu Leu Ile Lys Lys Arg
    290                 295                 300
Asn Arg Asn Arg Gln Asn Arg Gln Glu Asn Lys Tyr Trp Asp Ile Gln
305                 310                 315                 320
Ile Gly Tyr Gln Thr Arg Glu Val Met Cys Ile Asn Lys Thr Gly Lys
                325                 330                 335
Ala Ala Asp Leu Ser Phe Cys Gln Gln Glu Lys Leu Pro Met Thr Phe
            340                 345                 350
Gln Ser Cys Val Ile Thr Lys Glu Cys Gln Val Ser Glu Trp Ser Glu
        355                 360                 365
Trp Ser Pro Cys Ser Lys Thr Cys His Asp Met Val Ser Pro Ala Gly
    370                 375                 380
Thr Arg Val Arg Thr Arg Thr Ile Arg Gln Phe Pro Ile Gly Ser Glu
385                 390                 395                 400
Lys Glu Cys Pro Glu Phe Glu Lys Glu Pro Cys Leu Ser Gln Gly
                405                 410                 415
Asp Gly Val Val Pro Cys Ala Thr Tyr Gly Trp Arg Thr Thr Glu Trp
            420                 425                 430
Thr Glu Cys Arg Val Asp Pro Leu Leu Ser Gln Gln Asp Lys Arg Arg
        435                 440                 445
```

```
Gly Asn Gln Thr Ala Leu Cys Gly Gly Ile Gln Thr Arg Glu Val
    450                 455                 460

Tyr Cys Val Gln Ala Asn Glu Asn Leu Leu Ser Gln Leu Ser Thr His
465                 470                 475                 480

Lys Asn Lys Glu Ala Ser Lys Pro Met Asp Leu Lys Leu Cys Thr Gly
                485                 490                 495

Pro Ile Pro Asn Thr Thr Gln Leu Cys His Ile Pro Cys Pro Thr Glu
                500                 505                 510

Cys Glu Val Ser Pro Trp Ser Ala Trp Gly Pro Cys Thr Tyr Glu Asn
            515                 520                 525

Cys Asn Asp Gln Gln Gly Lys Lys Gly Phe Lys Leu Arg Lys Arg Arg
    530                 535                 540

Ile Thr Asn Glu Pro Thr Gly Ser Gly Val Thr Gly Asn Cys Pro
545                 550                 555                 560

His Leu Leu Glu Ala Ile Pro Cys Glu Glu Pro Ala Cys Tyr Asp Trp
                565                 570                 575

Lys Ala Val Arg Leu Gly Asn Cys Glu Pro Asp Asn Gly Lys Glu Cys
            580                 585                 590

Gly Pro Gly Thr Gln Val Gln Glu Val Val Cys Ile Asn Ser Asp Gly
            595                 600                 605

Glu Glu Val Asp Arg Gln Leu Cys Arg Asp Ala Ile Phe Pro Ile Pro
            610                 615                 620

Val Ala Cys Asp Ala Pro Cys Pro Lys Asp Cys Val Leu Ser Thr Trp
625                 630                 635                 640

Ser Thr Trp Ser Ser Cys Ser His Thr Cys Ser Gly Lys Thr Thr Glu
                645                 650                 655

Gly Lys Gln Ile Arg Ala Arg Ser Ile Leu Ala Tyr Ala Gly Glu Glu
            660                 665                 670

Gly Gly Ile Arg Cys Pro Asn Ser Ser Ala Leu Gln Glu Val Arg Ser
            675                 680                 685

Cys Asn Glu His Pro Cys Thr Val Tyr His Trp Gln Thr Gly Pro Trp
    690                 695                 700

Gly Gln Cys Ile Glu Asp Thr Ser Val Ser Ser Phe Asn Thr Thr Thr
705                 710                 715                 720

Thr Trp Asn Gly Glu Ala Ser Cys Ser Val Gly Met Gln Thr Arg Lys
                725                 730                 735

Val Ile Cys Val Arg Val Asn Val Gly Gln Val Gly Pro Lys Lys Cys
                740                 745                 750

Pro Glu Ser Leu Arg Pro Glu Thr Val Arg Pro Cys Leu Leu Pro Cys
            755                 760                 765

Lys Lys Asp Cys Ile Val Thr Pro Tyr Ser Asp Trp Thr Ser Cys Pro
    770                 775                 780

Ser Ser Cys Lys Glu Gly Asp Ser Ser Ile Arg Lys Gln Ser Arg His
785                 790                 795                 800

Arg Val Ile Ile Gln Leu Pro Ala Asn Gly Gly Arg Asp Cys Thr Asp
                805                 810                 815

Pro Leu Tyr Glu Glu Lys Ala Cys Glu Ala Pro Gln Ala Cys Gln Ser
            820                 825                 830

Tyr Arg Trp Lys Thr His Lys Trp Arg Arg Cys Gln Leu Val Pro Trp
            835                 840                 845

Ser Val Gln Gln Asp Ser Pro Gly Ala Gln Glu Gly Cys Gly Pro Gly
    850                 855                 860
```

```
Arg Gln Ala Arg Ala Ile Thr Cys Arg Lys Gln Asp Gly Gly Gln Ala
865                 870                 875                 880

Gly Ile His Glu Cys Leu Gln Tyr Ala Gly Pro Val Pro Ala Leu Thr
            885                 890                 895

Gln Ala Cys Gln Ile Pro Cys Gln Asp Asp Cys Gln Leu Thr Ser Trp
        900                 905                 910

Ser Lys Phe Ser Ser Cys Asn Gly Asp Cys Gly Ala Val Arg Thr Arg
    915                 920                 925

Lys Arg Thr Leu Val Gly Lys Ser Lys Lys Glu Lys Cys Lys Asn
930                 935                 940

Ser His Leu Tyr Pro Leu Ile Glu Thr Gln Tyr Cys Pro Cys Asp Lys
945                 950                 955                 960

Tyr Asn Ala Gln Pro Val Gly Asn Trp Ser Asp Cys Ile Leu Pro Glu
            965                 970                 975

Gly Lys Val Glu Val Leu Leu Gly Met Lys Val Gln Gly Asp Ile Lys
            980                 985                 990

Glu Cys Gly Gln Gly Tyr Arg Tyr Gln Ala Met Ala Cys Tyr Asp Gln
        995                 1000                1005

Asn Gly Arg Leu Val Glu Thr Ser Arg Cys Asn Ser His Gly Tyr
    1010                1015                1020

Ile Glu Glu Ala Cys Ile Ile Pro Cys Pro Ser Asp Cys Lys Leu
    1025                1030                1035

Ser Glu Trp Ser Asn Trp Ser Arg Cys Ser Lys Ser Cys Gly Ser
    1040                1045                1050

Gly Val Lys Val Arg Ser Lys Trp Leu Arg Glu Lys Pro Tyr Asn
    1055                1060                1065

Gly Gly Arg Pro Cys Pro Lys Leu Asp His Val Asn Gln Ala Gln
    1070                1075                1080

Val Tyr Glu Val Pro Cys His Ser Asp Cys Asn Gln Tyr Leu
    1085                1090                1095

Trp Val Thr Glu Pro Trp Ser Ile Cys Lys Val Thr Phe Val Asn
    1100                1105                1110

Met Arg Glu Asn Cys Gly Glu Gly Val Gln Thr Arg Lys Val Arg
    1115                1120                1125

Cys Met Gln Asn Thr Ala Asp Gly Pro Ser Glu His Val Glu Asp
    1130                1135                1140

Tyr Leu Cys Asp Pro Glu Glu Met Pro Leu Gly Ser Arg Val Cys
    1145                1150                1155

Lys Leu Pro Cys Pro Glu Asp Cys Val Ile Ser Glu Trp Gly Pro
    1160                1165                1170

Trp Thr Gln Cys Val Leu Pro Cys Asn Gln Ser Ser Phe Arg Gln
    1175                1180                1185

Arg Ser Ala Asp Pro Ile Arg Gln Pro Ala Asp Glu Gly Arg Ser
    1190                1195                1200

Cys Pro Asn Ala Val Glu Lys Glu Pro Cys Asn Leu Asn Lys Asn
    1205                1210                1215

Cys Tyr His Tyr Asp Tyr Asn Val Thr Asp Trp Ser Thr Cys Gln
    1220                1225                1230

Leu Ser Glu Lys Ala Val Cys Gly Asn Gly Ile Lys Thr Arg Met
    1235                1240                1245

Leu Asp Cys Val Arg Ser Asp Gly Lys Ser Val Asp Leu Lys Tyr
    1250                1255                1260

Cys Glu Ala Leu Gly Leu Glu Lys Asn Trp Gln Met Asn Thr Ser
```

```
            1265                1270                1275
Cys Met Val Glu Cys Pro Val Asn Cys Gln Leu Ser Asp Trp Ser
        1280                1285                1290

Pro Trp Ser Glu Cys Ser Gln Thr Cys Gly Leu Thr Gly Lys Met
        1295                1300                1305

Ile Arg Arg Arg Thr Val Thr Gln Pro Phe Gln Gly Asp Gly Arg
        1310                1315                1320

Pro Cys Pro Ser Leu Met Asp Gln Ser Lys Pro Cys Pro Val Lys
        1325                1330                1335

Pro Cys Tyr Arg Trp Gln Tyr Gly Gln Trp Ser Pro Cys Gln Val
        1340                1345                1350

Gln Glu Ala Gln Cys Gly Glu Gly Thr Arg Thr Arg Asn Ile Ser
        1355                1360                1365

Cys Val Val Ser Asp Gly Ser Ala Asp Phe Ser Lys Val Val
        1370                1375                1380

Asp Glu Glu Phe Cys Ala Asp Ile Glu Leu Ile Ile Asp Gly Asn
        1385                1390                1395

Lys Asn Met Val Leu Glu Glu Ser Cys Ser Gln Pro Cys Pro Gly
        1400                1405                1410

Asp Cys Tyr Leu Lys Asp Trp Ser Ser Trp Ser Leu Cys Gln Leu
        1415                1420                1425

Thr Cys Val Asn Gly Glu Asp Leu Gly Phe Gly Gly Ile Gln Val
        1430                1435                1440

Arg Ser Arg Pro Val Ile Ile Gln Glu Leu Glu Asn Gln His Leu
        1445                1450                1455

Cys Pro Glu Gln Met Leu Glu Thr Lys Ser Cys Tyr Asp Gly Gln
        1460                1465                1470

Cys Tyr Glu Tyr Lys Trp Met Ala Ser Ala Trp Lys Gly Ser Ser
        1475                1480                1485

Arg Thr Val Trp Cys Gln Arg Ser Asp Gly Ile Asn Val Thr Gly
        1490                1495                1500

Gly Cys Leu Val Met Ser Gln Pro Asp Ala Asp Arg Ser Cys Asn
        1505                1510                1515

Pro Pro Cys Ser Gln Pro His Ser Tyr Cys Ser Glu Thr Lys Thr
        1520                1525                1530

Cys His Cys Glu Glu Gly Tyr Thr Glu Val Met Ser Ser Asn Ser
        1535                1540                1545

Thr Leu Glu Gln Cys Thr Leu Ile Pro Val Val Leu Pro Thr
        1550                1555                1560

Met Glu Asp Lys Arg Gly Asp Val Lys Thr Ser Arg Ala Val His
        1565                1570                1575

Pro Thr Gln Pro Ser Ser Asn Pro Ala Gly Arg Gly Arg Thr Trp
        1580                1585                1590

Phe Leu Gln Pro Phe Gly Pro Asp Gly Arg Leu Lys Thr Trp Val
        1595                1600                1605

Tyr Gly Val Ala Ala Gly Ala Phe Val Leu Leu Ile Phe Ile Val
        1610                1615                1620

Ser Met Ile Tyr Leu Ala Cys Lys Lys Pro Lys Lys Pro Gln Arg
        1625                1630                1635

Arg Gln Asn Asn Arg Leu Lys Pro Leu Thr Leu Ala Tyr Asp Gly
        1640                1645                1650

Asp Ala Asp Met
        1655
```

<210> SEQ ID NO 5
<211> LENGTH: 810
<212> TYPE: PRT
<213> ORGANISM: Homo sapiens

<400> SEQUENCE: 5

Met Pro Met Asp Leu Ile Leu Val Val Trp Phe Cys Val Cys Thr Ala
1               5                   10                  15

Arg Thr Val Val Gly Phe Gly Met Asp Pro Asp Leu Gln Met Asp Ile
            20                  25                  30

Val Thr Glu Leu Asp Leu Val Asn Thr Thr Leu Gly Val Ala Gln Val
        35                  40                  45

Ser Gly Met His Asn Ala Ser Lys Ala Phe Leu Phe Gln Asp Ile Glu
    50                  55                  60

Arg Glu Ile His Ala Ala Pro His Val Ser Glu Lys Leu Ile Gln Leu
65                  70                  75                  80

Phe Arg Asn Lys Ser Glu Phe Thr Ile Leu Ala Thr Val Gln Gln Lys
                85                  90                  95

Pro Ser Thr Ser Gly Val Ile Leu Ser Ile Arg Glu Leu Glu His Ser
            100                 105                 110

Tyr Phe Glu Leu Glu Ser Ser Gly Leu Arg Asp Glu Ile Arg Tyr His
        115                 120                 125

Tyr Ile His Asn Gly Lys Pro Arg Thr Glu Ala Leu Pro Tyr Arg Met
    130                 135                 140

Ala Asp Gly Gln Trp His Lys Val Ala Leu Ser Val Ser Ala Ser His
145                 150                 155                 160

Leu Leu Leu His Val Asp Cys Asn Arg Ile Tyr Glu Arg Val Ile Asp
                165                 170                 175

Pro Pro Asp Thr Asn Leu Pro Pro Gly Ile Asn Leu Trp Leu Gly Gln
            180                 185                 190

Arg Asn Gln Lys His Gly Leu Phe Lys Gly Ile Ile Gln Asp Gly Lys
        195                 200                 205

Ile Ile Phe Met Pro Asn Gly Tyr Ile Thr Gln Cys Pro Asn Leu Asn
    210                 215                 220

His Thr Cys Pro Thr Cys Ser Asp Phe Leu Ser Leu Val Gln Gly Ile
225                 230                 235                 240

Met Asp Leu Gln Glu Leu Leu Ala Lys Met Thr Ala Lys Leu Asn Tyr
                245                 250                 255

Ala Glu Thr Arg Leu Ser Gln Leu Glu Asn Cys His Cys Glu Lys Thr
            260                 265                 270

Cys Gln Val Ser Gly Leu Leu Tyr Arg Asp Gln Asp Ser Trp Val Asp
        275                 280                 285

Gly Asp His Cys Arg Asn Cys Thr Cys Lys Ser Gly Ala Val Glu Cys
    290                 295                 300

Arg Arg Met Ser Cys Pro Pro Leu Asn Cys Ser Pro Asp Ser Leu Pro
305                 310                 315                 320

Val His Ile Ala Gly Gln Cys Cys Lys Val Cys Arg Pro Lys Cys Ile
                325                 330                 335

Tyr Gly Gly Lys Val Leu Ala Glu Gly Gln Arg Ile Leu Thr Lys Ser
            340                 345                 350

Cys Arg Glu Cys Arg Gly Gly Val Leu Val Lys Ile Thr Glu Met Cys
        355                 360                 365

Pro Pro Leu Asn Cys Ser Glu Lys Asp His Ile Leu Pro Glu Asn Gln

-continued

```
                370                 375                 380
Cys Cys Arg Val Cys Arg Gly His Asn Phe Cys Ala Glu Gly Pro Lys
385                 390                 395                 400

Cys Gly Glu Asn Ser Glu Cys Lys Asn Trp Asn Thr Lys Ala Thr Cys
                405                 410                 415

Glu Cys Lys Ser Gly Tyr Ile Ser Val Gln Gly Asp Ser Ala Tyr Cys
                420                 425                 430

Glu Asp Ile Asp Glu Cys Ala Ala Lys Met His Tyr Cys His Ala Asn
                435                 440                 445

Thr Val Cys Val Asn Leu Pro Gly Leu Tyr Arg Cys Asp Cys Val Pro
450                 455                 460

Gly Tyr Ile Arg Val Asp Asp Phe Ser Cys Thr Glu His Asp Glu Cys
465                 470                 475                 480

Gly Ser Gly Gln His Asn Cys Asp Glu Asn Ala Ile Cys Thr Asn Thr
                485                 490                 495

Val Gln Gly His Ser Cys Thr Cys Lys Pro Gly Tyr Val Gly Asn Gly
                500                 505                 510

Thr Ile Cys Arg Ala Phe Cys Glu Glu Gly Cys Arg Tyr Gly Gly Thr
                515                 520                 525

Cys Val Ala Pro Asn Lys Cys Val Cys Pro Ser Gly Phe Thr Gly Ser
530                 535                 540

His Cys Glu Lys Asp Ile Asp Glu Cys Ser Glu Gly Ile Ile Glu Cys
545                 550                 555                 560

His Asn His Ser Arg Cys Val Asn Leu Pro Gly Trp Tyr His Cys Glu
                565                 570                 575

Cys Arg Ser Gly Phe His Asp Asp Gly Thr Tyr Ser Leu Ser Gly Glu
                580                 585                 590

Ser Cys Ile Asp Ile Asp Glu Cys Ala Leu Arg Thr His Thr Cys Trp
                595                 600                 605

Asn Asp Ser Ala Cys Ile Asn Leu Ala Gly Gly Phe Asp Cys Leu Cys
                610                 615                 620

Pro Ser Gly Pro Ser Ser Gly Asp Cys Pro His Glu Gly Gly Leu
625                 630                 635                 640

Lys His Asn Gly Gln Val Trp Thr Leu Lys Glu Asp Arg Cys Ser Val
                645                 650                 655

Cys Ser Cys Lys Asp Gly Lys Ile Phe Cys Arg Arg Thr Ala Cys Asp
                660                 665                 670

Cys Gln Asn Pro Ser Ala Asp Leu Phe Cys Cys Pro Glu Cys Asp Thr
                675                 680                 685

Arg Val Thr Ser Gln Cys Leu Asp Gln Asn Gly His Lys Leu Tyr Arg
690                 695                 700

Ser Gly Asp Asn Trp Thr His Ser Cys Gln Gln Cys Arg Cys Leu Glu
705                 710                 715                 720

Gly Glu Val Asp Cys Trp Pro Leu Thr Cys Pro Asn Leu Ser Cys Glu
                725                 730                 735

Tyr Thr Ala Ile Leu Glu Gly Glu Cys Cys Pro Arg Cys Val Ser Asp
                740                 745                 750

Pro Cys Leu Ala Asp Asn Ile Thr Tyr Asp Ile Arg Lys Thr Cys Leu
                755                 760                 765

Asp Ser Tyr Gly Val Ser Arg Leu Ser Gly Ser Val Trp Thr Met Ala
                770                 775                 780

Gly Ser Pro Cys Thr Thr Cys Lys Cys Lys Asn Gly Arg Val Cys Cys
785                 790                 795                 800
```

```
Ser Val Asp Phe Glu Cys Leu Gln Asn Asn
            805                 810

<210> SEQ ID NO 6
<211> LENGTH: 748
<212> TYPE: PRT
<213> ORGANISM: Homo sapiens

<400> SEQUENCE: 6

Met Gly Arg Ala Gly Ala Ala Val Ile Pro Gly Leu Ala Leu Leu
1               5                   10                  15

Trp Ala Val Gly Leu Gly Ser Ala Ala Pro Ser Pro Pro Arg Leu Arg
                20                  25                  30

Leu Ser Phe Gln Glu Leu Gln Ala Trp His Gly Leu Gln Thr Phe Ser
            35                  40                  45

Leu Glu Arg Thr Cys Cys Tyr Gln Ala Leu Leu Val Asp Glu Glu Arg
        50                  55                  60

Gly Arg Leu Phe Val Gly Ala Glu Asn His Val Ala Ser Leu Asn Leu
65                  70                  75                  80

Asp Asn Ile Ser Lys Arg Ala Lys Lys Leu Ala Trp Pro Ala Pro Val
                85                  90                  95

Glu Trp Arg Glu Glu Cys Asn Trp Ala Gly Lys Asp Ile Gly Thr Glu
                100                 105                 110

Cys Met Asn Phe Val Lys Leu Leu His Ala Tyr Asn Arg Thr His Leu
            115                 120                 125

Leu Ala Cys Gly Thr Gly Ala Phe His Pro Thr Cys Ala Phe Val Glu
        130                 135                 140

Val Gly His Arg Ala Glu Glu Pro Val Leu Arg Leu Asp Pro Gly Arg
145                 150                 155                 160

Ile Glu Asp Gly Lys Gly Lys Ser Pro Tyr Asp Pro Arg His Arg Ala
                165                 170                 175

Ala Ser Val Leu Val Gly Glu Glu Leu Tyr Ser Gly Val Ala Ala Asp
            180                 185                 190

Leu Met Gly Arg Asp Phe Thr Ile Phe Arg Ser Leu Gly Gln Arg Pro
        195                 200                 205

Ser Leu Arg Thr Glu Pro His Asp Ser Arg Trp Leu Asn Glu Pro Lys
    210                 215                 220

Phe Val Lys Val Phe Trp Ile Pro Glu Ser Glu Asn Pro Asp Asp Asp
225                 230                 235                 240

Lys Ile Tyr Phe Phe Arg Glu Thr Ala Val Glu Ala Ala Pro Ala
                245                 250                 255

Leu Gly Arg Leu Ser Val Ser Arg Val Gly Gln Ile Cys Arg Asn Asp
            260                 265                 270

Val Gly Gly Gln Arg Ser Leu Val Asn Lys Trp Thr Thr Phe Leu Lys
        275                 280                 285

Ala Arg Leu Val Cys Ser Val Pro Gly Val Glu Gly Asp Thr His Phe
    290                 295                 300

Asp Gln Leu Gln Asp Val Phe Leu Leu Ser Ser Arg Asp His Arg Thr
305                 310                 315                 320

Pro Leu Leu Tyr Ala Val Phe Ser Thr Ser Ser Ile Phe Gln Gly Ser
                325                 330                 335

Ala Val Cys Val Tyr Ser Met Asn Asp Val Arg Arg Ala Phe Leu Gly
            340                 345                 350

Pro Phe Ala His Lys Glu Gly Pro Met His Gln Trp Val Ser Tyr Gln
```

```
            355                 360                 365
Gly Arg Val Pro Tyr Pro Arg Pro Gly Met Cys Pro Ser Lys Thr Phe
    370                 375                 380

Gly Thr Phe Ser Ser Thr Lys Asp Phe Pro Asp Asp Val Ile Gln Phe
385                 390                 395                 400

Ala Arg Asn His Pro Leu Met Tyr Asn Ser Val Leu Pro Thr Gly Gly
                405                 410                 415

Arg Pro Leu Phe Leu Gln Val Gly Ala Asn Tyr Thr Phe Thr Gln Ile
            420                 425                 430

Ala Ala Asp Arg Val Ala Ala Asp Gly His Tyr Asp Val Leu Phe
        435                 440                 445

Ile Gly Thr Asp Val Gly Thr Val Leu Lys Val Ile Ser Val Pro Lys
    450                 455                 460

Gly Ser Arg Pro Ser Ala Glu Gly Leu Leu Glu Glu Leu His Val
465                 470                 475                 480

Phe Glu Asp Ser Ala Ala Val Thr Ser Met Gln Ile Ser Ser Lys Arg
                485                 490                 495

His Gln Leu Tyr Val Ala Ser Arg Ser Ala Val Ala Gln Ile Ala Leu
            500                 505                 510

His Arg Cys Ala Ala His Gly Arg Val Cys Thr Glu Cys Leu Ala
        515                 520                 525

Arg Asp Pro Tyr Cys Ala Trp Asp Gly Val Ala Cys Thr Arg Phe Gln
530                 535                 540

Pro Ser Ala Lys Arg Arg Phe Arg Arg Gln Asp Val Arg Asn Gly Asp
545                 550                 555                 560

Pro Ser Thr Leu Cys Ser Gly Asp Ser Ser Arg Pro Ala Leu Leu Glu
                565                 570                 575

His Lys Val Phe Gly Val Glu Gly Ser Ser Ala Phe Leu Glu Cys Glu
            580                 585                 590

Pro Arg Ser Leu Gln Ala Arg Val Glu Trp Thr Phe Gln Arg Ala Gly
        595                 600                 605

Val Thr Ala His Thr Gln Val Leu Ala Glu Glu Arg Thr Glu Arg Thr
    610                 615                 620

Ala Arg Gly Leu Leu Leu Arg Arg Leu Arg Arg Asp Ser Gly Val
625                 630                 635                 640

Tyr Leu Cys Ala Ala Val Glu Gln Gly Phe Thr Gln Pro Leu Arg Arg
                645                 650                 655

Leu Ser Leu His Val Leu Ser Ala Thr Gln Ala Glu Arg Leu Ala Arg
            660                 665                 670

Ala Glu Glu Ala Ala Pro Ala Pro Pro Gly Pro Lys Leu Trp Tyr
        675                 680                 685

Arg Asp Phe Leu Gln Leu Val Glu Pro Gly Gly Gly Ser Ala Asn
    690                 695                 700

Ser Leu Arg Met Cys Arg Pro Gln Pro Ala Leu Gln Ser Leu Pro Leu
705                 710                 715                 720

Glu Ser Arg Arg Lys Gly Arg Asn Arg Thr His Ala Pro Glu Pro
                725                 730                 735

Arg Ala Glu Arg Gly Pro Arg Ser Ala Thr His Trp
            740                 745
```

<210> SEQ ID NO 7
<211> LENGTH: 728
<212> TYPE: PRT
<213> ORGANISM: Artificial Sequence
<220> FEATURE:
<223> OTHER INFORMATION: Exostosin 2 with C-terminal His tag

<400> SEQUENCE: 7

```
Met Cys Ala Ser Val Lys Tyr Asn Ile Arg Gly Pro Ala Leu Ile Pro
1               5                   10                  15

Arg Met Lys Thr Lys His Arg Ile Tyr Tyr Ile Thr Leu Phe Ser Ile
            20                  25                  30

Val Leu Leu Gly Leu Ile Ala Thr Gly Met Phe Gln Phe Trp Pro His
        35                  40                  45

Ser Ile Glu Ser Ser Asn Asp Trp Asn Val Glu Lys Arg Ser Ile Arg
    50                  55                  60

Asp Val Pro Val Val Arg Leu Pro Ala Asp Ser Pro Ile Pro Glu Arg
65                  70                  75                  80

Gly Asp Leu Ser Cys Arg Met His Thr Cys Phe Asp Val Tyr Arg Cys
                85                  90                  95

Gly Phe Asn Pro Lys Asn Lys Ile Lys Val Tyr Ile Tyr Ala Leu Lys
                100                 105                 110

Lys Tyr Val Asp Asp Phe Gly Val Ser Val Ser Asn Thr Ile Ser Arg
            115                 120                 125

Glu Tyr Asn Glu Leu Leu Met Ala Ile Ser Asp Ser Asp Tyr Tyr Thr
    130                 135                 140

Asp Asp Ile Asn Arg Ala Cys Leu Phe Val Pro Ser Ile Asp Val Leu
145                 150                 155                 160

Asn Gln Asn Thr Leu Arg Ile Lys Glu Thr Ala Gln Ala Met Ala Gln
                165                 170                 175

Leu Ser Arg Trp Asp Arg Gly Thr Asn His Leu Leu Phe Asn Met Leu
            180                 185                 190

Pro Gly Gly Pro Pro Asp Tyr Asn Thr Ala Leu Asp Val Pro Arg Asp
        195                 200                 205

Arg Ala Leu Leu Ala Gly Gly Phe Ser Thr Trp Thr Tyr Arg Gln
210                 215                 220

Gly Tyr Asp Val Ser Ile Pro Val Tyr Ser Pro Leu Ser Ala Glu Val
225                 230                 235                 240

Asp Leu Pro Glu Lys Gly Pro Gly Pro Arg Gln Tyr Phe Leu Leu Ser
                245                 250                 255

Ser Gln Val Gly Leu His Pro Glu Tyr Arg Glu Asp Leu Glu Ala Leu
            260                 265                 270

Gln Val Lys His Gly Glu Ser Val Leu Val Leu Asp Lys Cys Thr Asn
        275                 280                 285

Leu Ser Glu Gly Val Leu Ser Val Arg Lys Arg Cys His Lys His Gln
    290                 295                 300

Val Phe Asp Tyr Pro Gln Val Leu Gln Glu Ala Thr Phe Cys Val Val
305                 310                 315                 320

Leu Arg Gly Ala Arg Leu Gly Gln Ala Val Leu Ser Asp Val Leu Gln
                325                 330                 335

Ala Gly Cys Val Pro Val Val Ile Ala Asp Ser Tyr Ile Leu Pro Phe
            340                 345                 350

Ser Glu Val Leu Asp Trp Lys Arg Ala Ser Val Val Pro Glu Glu
        355                 360                 365

Lys Met Ser Asp Val Tyr Ser Ile Leu Gln Ser Ile Pro Gln Arg Gln
    370                 375                 380

Ile Glu Glu Met Gln Arg Gln Ala Arg Trp Phe Trp Glu Ala Tyr Phe
385                 390                 395                 400
```

Gln Ser Ile Lys Ala Ile Ala Leu Ala Thr Leu Gln Ile Ile Asn Asp
            405                 410                 415

Arg Ile Tyr Pro Tyr Ala Ala Ile Ser Tyr Glu Glu Trp Asn Asp Pro
            420                 425                 430

Pro Ala Val Lys Trp Gly Ser Val Ser Asn Pro Leu Phe Leu Pro Leu
            435                 440                 445

Ile Pro Pro Gln Ser Gln Gly Phe Thr Ala Ile Val Leu Thr Tyr Asp
        450                 455                 460

Arg Val Glu Ser Leu Phe Arg Val Ile Thr Glu Val Ser Lys Val Pro
465                 470                 475                 480

Ser Leu Ser Lys Leu Leu Val Val Trp Asn Asn Gln Asn Lys Asn Pro
            485                 490                 495

Pro Glu Asp Ser Leu Trp Pro Lys Ile Arg Val Pro Leu Lys Val Val
            500                 505                 510

Arg Thr Ala Glu Asn Lys Leu Ser Asn Arg Phe Phe Pro Tyr Asp Glu
            515                 520                 525

Ile Glu Thr Glu Ala Val Leu Ala Ile Asp Asp Ile Ile Met Leu
            530                 535                 540

Thr Ser Asp Glu Leu Gln Phe Gly Tyr Glu Val Trp Arg Glu Phe Pro
545                 550                 555                 560

Asp Arg Leu Val Gly Tyr Pro Gly Arg Leu His Leu Trp Asp His Glu
            565                 570                 575

Met Asn Lys Trp Lys Tyr Glu Ser Glu Trp Thr Asn Glu Val Ser Met
            580                 585                 590

Val Leu Thr Gly Ala Ala Phe Tyr His Lys Tyr Phe Asn Tyr Leu Tyr
            595                 600                 605

Thr Tyr Lys Met Pro Gly Asp Ile Lys Asn Trp Val Asp Ala His Met
610                 615                 620

Asn Cys Glu Asp Ile Ala Met Asn Phe Leu Val Ala Asn Val Thr Gly
625                 630                 635                 640

Lys Ala Val Ile Lys Val Thr Pro Arg Lys Lys Phe Lys Cys Pro Glu
            645                 650                 655

Cys Thr Ala Ile Asp Gly Leu Ser Leu Asp Gln Thr His Met Val Glu
            660                 665                 670

Arg Ser Glu Cys Ile Asn Lys Phe Ala Ser Val Phe Gly Thr Met Pro
675                 680                 685

Leu Lys Val Val Glu His Arg Ala Asp Pro Val Leu Tyr Lys Asp Asp
        690                 695                 700

Phe Pro Glu Lys Leu Lys Ser Phe Pro Asn Ile Gly Ser Leu Leu Glu
705                 710                 715                 720

His His His His His His His
                725

<210> SEQ ID NO 8
<211> LENGTH: 756
<212> TYPE: PRT
<213> ORGANISM: Artificial Sequence
<220> FEATURE:
<223> OTHER INFORMATION: Exostosin 1 with C-terminal His tag

<400> SEQUENCE: 8

Met Gln Ala Lys Lys Arg Tyr Phe Ile Leu Leu Ser Ala Gly Ser Cys
1               5                   10                  15

Leu Ala Leu Leu Phe Tyr Phe Gly Gly Leu Gln Phe Arg Ala Ser Arg
            20                  25                  30

```
Ser His Ser Arg Arg Glu Glu His Ser Gly Arg Asn Gly Leu His His
        35                  40                  45

Pro Ser Pro Asp His Phe Trp Pro Arg Phe Pro Asp Ala Leu Arg Pro
    50                  55                  60

Phe Val Pro Trp Asp Gln Leu Glu Asn Glu Asp Ser Ser Val His Ile
65                  70                  75                  80

Ser Pro Arg Gln Lys Arg Asp Ala Asn Ser Ser Ile Tyr Lys Gly Lys
                85                  90                  95

Lys Cys Arg Met Glu Ser Cys Phe Asp Phe Thr Leu Cys Lys Lys Asn
                100                 105                 110

Gly Phe Lys Val Tyr Val Tyr Pro Gln Gln Lys Gly Glu Lys Ile Ala
            115                 120                 125

Glu Ser Tyr Gln Asn Ile Leu Ala Ala Ile Glu Gly Ser Arg Phe Tyr
        130                 135                 140

Thr Ser Asp Pro Ser Gln Ala Cys Leu Phe Val Leu Ser Leu Asp Thr
145                 150                 155                 160

Leu Asp Arg Asp Gln Leu Ser Pro Gln Tyr Val His Asn Leu Arg Ser
                165                 170                 175

Lys Val Gln Ser Leu His Leu Trp Asn Asn Gly Arg Asn His Leu Ile
            180                 185                 190

Phe Asn Leu Tyr Ser Gly Thr Trp Pro Asp Tyr Thr Glu Asp Val Gly
        195                 200                 205

Phe Asp Ile Gly Gln Ala Met Leu Ala Lys Ala Ser Ile Ser Thr Glu
210                 215                 220

Asn Phe Arg Pro Asn Phe Asp Val Ser Ile Pro Leu Phe Ser Lys Asp
225                 230                 235                 240

His Pro Arg Thr Gly Gly Glu Arg Gly Phe Leu Lys Phe Asn Thr Ile
                245                 250                 255

Pro Pro Leu Arg Lys Tyr Met Leu Val Phe Lys Gly Lys Arg Tyr Leu
            260                 265                 270

Thr Gly Ile Gly Ser Asp Thr Arg Asn Ala Leu Tyr His Val His Asn
        275                 280                 285

Gly Glu Asp Val Val Leu Leu Thr Thr Cys Lys His Gly Lys Asp Trp
    290                 295                 300

Gln Lys His Lys Asp Ser Arg Cys Asp Arg Asp Asn Thr Glu Tyr Glu
305                 310                 315                 320

Lys Tyr Asp Tyr Arg Glu Met Leu His Asn Ala Thr Phe Cys Leu Val
                325                 330                 335

Pro Arg Gly Arg Arg Leu Gly Ser Phe Arg Phe Leu Glu Ala Leu Gln
            340                 345                 350

Ala Ala Cys Val Pro Val Met Leu Ser Asn Gly Trp Glu Leu Pro Phe
        355                 360                 365

Ser Glu Val Ile Asn Trp Asn Gln Ala Ala Val Ile Gly Asp Glu Arg
370                 375                 380

Leu Leu Leu Gln Ile Pro Ser Thr Ile Arg Ser Ile His Gln Asp Lys
385                 390                 395                 400

Ile Leu Ala Leu Arg Gln Gln Thr Gln Phe Leu Trp Glu Ala Tyr Phe
                405                 410                 415

Ser Ser Val Glu Lys Ile Val Leu Thr Thr Leu Glu Ile Ile Gln Asp
            420                 425                 430

Arg Ile Phe Lys His Ile Ser Arg Asn Ser Leu Ile Trp Asn Lys His
        435                 440                 445
```

Pro Gly Gly Leu Phe Val Leu Pro Gln Tyr Ser Ser Tyr Leu Gly Asp
                450                 455                 460

Phe Pro Tyr Tyr Tyr Ala Asn Leu Gly Leu Lys Pro Pro Ser Lys Phe
465                 470                 475                 480

Thr Ala Val Ile His Ala Val Thr Pro Leu Val Ser Gln Ser Gln Pro
                485                 490                 495

Val Leu Lys Leu Leu Val Ala Ala Lys Ser Gln Tyr Cys Ala Gln
                500                 505                 510

Ile Ile Val Leu Trp Asn Cys Asp Lys Pro Leu Pro Ala Lys His Arg
                515                 520                 525

Trp Pro Ala Thr Ala Val Pro Val Val Ile Glu Gly Glu Ser Lys
530                 535                 540

Val Met Ser Ser Arg Phe Leu Pro Tyr Asp Asn Ile Ile Thr Asp Ala
545                 550                 555                 560

Val Leu Ser Leu Asp Glu Asp Thr Val Leu Ser Thr Thr Glu Val Asp
                565                 570                 575

Phe Ala Phe Thr Val Trp Gln Ser Phe Pro Glu Arg Ile Val Gly Tyr
                580                 585                 590

Pro Ala Arg Ser His Phe Trp Asp Asn Ser Lys Glu Arg Trp Gly Tyr
                595                 600                 605

Thr Ser Lys Trp Thr Asn Asp Tyr Ser Met Val Leu Thr Gly Ala Ala
                610                 615                 620

Ile Tyr His Lys Tyr Tyr His Tyr Leu Tyr Ser His Tyr Leu Pro Ala
625                 630                 635                 640

Ser Leu Lys Asn Met Val Asp Gln Leu Ala Asn Cys Glu Asp Ile Leu
                645                 650                 655

Met Asn Phe Leu Val Ser Ala Val Thr Lys Leu Pro Pro Ile Lys Val
                660                 665                 670

Thr Gln Lys Lys Gln Tyr Lys Glu Thr Met Met Gly Gln Thr Ser Arg
                675                 680                 685

Ala Ser Arg Trp Ala Asp Pro Asp His Phe Ala Gln Arg Gln Ser Cys
                690                 695                 700

Met Asn Thr Phe Ala Ser Trp Phe Gly Tyr Met Pro Leu Ile His Ser
705                 710                 715                 720

Gln Met Arg Leu Asp Pro Val Leu Phe Lys Asp Gln Val Ser Ile Leu
                725                 730                 735

Arg Lys Lys Tyr Arg Asp Ile Glu Arg Leu Leu Glu His His His
                740                 745                 750

His His His His
        755

<210> SEQ ID NO 9
<211> LENGTH: 672
<212> TYPE: PRT
<213> ORGANISM: Artificial Sequence
<220> FEATURE:
<223> OTHER INFORMATION: Exostosin 2 fragment with C-terminal His tag

<400> SEQUENCE: 9

Ser Asn Asp Trp Asn Val Glu Lys Arg Ser Ile Arg Asp Val Pro Val
1               5                   10                  15

Val Arg Leu Pro Ala Asp Ser Pro Ile Pro Glu Arg Gly Asp Leu Ser
                20                  25                  30

Cys Arg Met His Thr Cys Phe Asp Val Tyr Arg Cys Gly Phe Asn Pro
                35                  40                  45

```
Lys Asn Lys Ile Lys Val Tyr Ile Tyr Ala Leu Lys Lys Tyr Val Asp
     50                  55                  60

Asp Phe Gly Val Ser Val Ser Asn Thr Ile Ser Arg Glu Tyr Asn Glu
 65                  70                  75                  80

Leu Leu Met Ala Ile Ser Asp Ser Asp Tyr Tyr Thr Asp Asp Ile Asn
                     85                  90                  95

Arg Ala Cys Leu Phe Val Pro Ser Ile Asp Val Leu Asn Gln Asn Thr
                100                 105                 110

Leu Arg Ile Lys Glu Thr Ala Gln Ala Met Ala Gln Leu Ser Arg Trp
            115                 120                 125

Asp Arg Gly Thr Asn His Leu Leu Phe Asn Met Leu Pro Gly Gly Pro
130                 135                 140

Pro Asp Tyr Asn Thr Ala Leu Asp Val Pro Arg Asp Arg Ala Leu Leu
145                 150                 155                 160

Ala Gly Gly Gly Phe Ser Thr Trp Thr Tyr Arg Gln Gly Tyr Asp Val
                165                 170                 175

Ser Ile Pro Val Tyr Ser Pro Leu Ser Ala Glu Val Asp Leu Pro Glu
                180                 185                 190

Lys Gly Pro Gly Pro Arg Gln Tyr Phe Leu Leu Ser Ser Gln Val Gly
            195                 200                 205

Leu His Pro Glu Tyr Arg Glu Asp Leu Glu Ala Leu Gln Val Lys His
210                 215                 220

Gly Glu Ser Val Leu Val Leu Asp Lys Cys Thr Asn Leu Ser Glu Gly
225                 230                 235                 240

Val Leu Ser Val Arg Lys Arg Cys His Lys His Gln Val Phe Asp Tyr
                245                 250                 255

Pro Gln Val Leu Gln Glu Ala Thr Phe Cys Val Val Leu Arg Gly Ala
                260                 265                 270

Arg Leu Gly Gln Ala Val Leu Ser Asp Val Leu Gln Ala Gly Cys Val
            275                 280                 285

Pro Val Val Ile Ala Asp Ser Tyr Ile Leu Pro Phe Ser Glu Val Leu
290                 295                 300

Asp Trp Lys Arg Ala Ser Val Val Val Pro Glu Glu Lys Met Ser Asp
305                 310                 315                 320

Val Tyr Ser Ile Leu Gln Ser Ile Pro Gln Arg Gln Ile Glu Glu Met
                325                 330                 335

Gln Arg Gln Ala Arg Trp Phe Trp Glu Ala Tyr Phe Gln Ser Ile Lys
            340                 345                 350

Ala Ile Ala Leu Ala Thr Leu Gln Ile Ile Asn Asp Arg Ile Tyr Pro
355                 360                 365

Tyr Ala Ala Ile Ser Tyr Glu Glu Trp Asn Asp Pro Pro Ala Val Lys
370                 375                 380

Trp Gly Ser Val Ser Asn Pro Leu Phe Leu Pro Leu Ile Pro Pro Gln
385                 390                 395                 400

Ser Gln Gly Phe Thr Ala Ile Val Leu Thr Tyr Asp Arg Val Glu Ser
                405                 410                 415

Leu Phe Arg Val Ile Thr Glu Val Ser Lys Val Pro Ser Leu Ser Lys
                420                 425                 430

Leu Leu Val Val Trp Asn Asn Gln Asn Lys Asn Pro Pro Glu Asp Ser
            435                 440                 445

Leu Trp Pro Lys Ile Arg Val Pro Leu Lys Val Val Arg Thr Ala Glu
450                 455                 460

Asn Lys Leu Ser Asn Arg Phe Phe Pro Tyr Asp Glu Ile Glu Thr Glu
```

```
            465                 470                 475                 480
Ala Val Leu Ala Ile Asp Asp Ile Ile Met Leu Thr Ser Asp Glu
                    485                 490                 495

Leu Gln Phe Gly Tyr Glu Val Trp Arg Glu Phe Pro Asp Arg Leu Val
                500                 505                 510

Gly Tyr Pro Gly Arg Leu His Leu Trp Asp His Glu Met Asn Lys Trp
                515                 520                 525

Lys Tyr Glu Ser Glu Trp Thr Asn Glu Val Ser Met Val Leu Thr Gly
                530                 535                 540

Ala Ala Phe Tyr His Lys Tyr Phe Asn Tyr Leu Tyr Thr Tyr Lys Met
545                 550                 555                 560

Pro Gly Asp Ile Lys Asn Trp Val Asp Ala His Met Asn Cys Glu Asp
                    565                 570                 575

Ile Ala Met Asn Phe Leu Val Ala Asn Val Thr Gly Lys Ala Val Ile
                580                 585                 590

Lys Val Thr Pro Arg Lys Lys Phe Lys Cys Pro Glu Cys Thr Ala Ile
                595                 600                 605

Asp Gly Leu Ser Leu Asp Gln Thr His Met Val Glu Arg Ser Glu Cys
                610                 615                 620

Ile Asn Lys Phe Ala Ser Val Phe Gly Thr Met Pro Leu Lys Val Val
625                 630                 635                 640

Glu His Arg Ala Asp Pro Val Leu Tyr Lys Asp Phe Pro Glu Lys
                    645                 650                 655

Leu Lys Ser Phe Pro Asn Ile Gly Ser Leu His His His His His
                660                 665                 670
```

<210> SEQ ID NO 10
<211> LENGTH: 666
<212> TYPE: PRT
<213> ORGANISM: Artificial Sequence
<220> FEATURE:
<223> OTHER INFORMATION: Exostosin 2 fragment

<400> SEQUENCE: 10

```
Ser Asn Asp Trp Asn Val Glu Lys Arg Ser Ile Arg Asp Val Pro Val
1               5                   10                  15

Val Arg Leu Pro Ala Asp Ser Pro Ile Pro Glu Arg Gly Asp Leu Ser
                20                  25                  30

Cys Arg Met His Thr Cys Phe Asp Val Tyr Arg Cys Gly Phe Asn Pro
            35                  40                  45

Lys Asn Lys Ile Lys Val Tyr Ile Tyr Ala Leu Lys Lys Tyr Val Asp
50                  55                  60

Asp Phe Gly Val Ser Val Ser Asn Thr Ile Ser Arg Glu Tyr Asn Glu
65                  70                  75                  80

Leu Leu Met Ala Ile Ser Asp Ser Asp Tyr Tyr Thr Asp Asp Ile Asn
                85                  90                  95

Arg Ala Cys Leu Phe Val Pro Ser Ile Asp Val Leu Asn Gln Asn Thr
            100                 105                 110

Leu Arg Ile Lys Glu Thr Ala Gln Ala Met Ala Gln Leu Ser Arg Trp
        115                 120                 125

Asp Arg Gly Thr Asn His Leu Leu Phe Asn Met Leu Pro Gly Gly Pro
    130                 135                 140

Pro Asp Tyr Asn Thr Ala Leu Asp Val Pro Arg Asp Arg Ala Leu Leu
145                 150                 155                 160

Ala Gly Gly Gly Phe Ser Thr Trp Thr Tyr Arg Gln Gly Tyr Asp Val
```

-continued

```
              165                 170                 175
Ser Ile Pro Val Tyr Ser Pro Leu Ser Ala Glu Val Asp Leu Pro Glu
            180                 185                 190

Lys Gly Pro Gly Pro Arg Gln Tyr Phe Leu Leu Ser Ser Gln Val Gly
            195                 200                 205

Leu His Pro Glu Tyr Arg Glu Asp Leu Glu Ala Leu Gln Val Lys His
            210                 215                 220

Gly Glu Ser Val Leu Val Leu Asp Lys Cys Thr Asn Leu Ser Glu Gly
225                 230                 235                 240

Val Leu Ser Val Arg Lys Arg Cys His Lys His Gln Val Phe Asp Tyr
                245                 250                 255

Pro Gln Val Leu Gln Glu Ala Thr Phe Cys Val Val Leu Arg Gly Ala
            260                 265                 270

Arg Leu Gly Gln Ala Val Leu Ser Asp Val Leu Gln Ala Gly Cys Val
            275                 280                 285

Pro Val Val Ile Ala Asp Ser Tyr Ile Leu Pro Phe Ser Glu Val Leu
            290                 295                 300

Asp Trp Lys Arg Ala Ser Val Val Pro Glu Glu Lys Met Ser Asp
305                 310                 315                 320

Val Tyr Ser Ile Leu Gln Ser Ile Pro Gln Arg Gln Ile Glu Glu Met
                325                 330                 335

Gln Arg Gln Ala Arg Trp Phe Trp Glu Ala Tyr Phe Gln Ser Ile Lys
            340                 345                 350

Ala Ile Ala Leu Ala Thr Leu Gln Ile Ile Asn Asp Arg Ile Tyr Pro
            355                 360                 365

Tyr Ala Ala Ile Ser Tyr Glu Glu Trp Asn Asp Pro Pro Ala Val Lys
            370                 375                 380

Trp Gly Ser Val Ser Asn Pro Leu Phe Leu Pro Leu Ile Pro Pro Gln
385                 390                 395                 400

Ser Gln Gly Phe Thr Ala Ile Val Leu Thr Tyr Asp Arg Val Glu Ser
                405                 410                 415

Leu Phe Arg Val Ile Thr Glu Val Ser Lys Val Pro Ser Leu Ser Lys
            420                 425                 430

Leu Leu Val Val Trp Asn Asn Gln Asn Lys Asn Pro Pro Glu Asp Ser
            435                 440                 445

Leu Trp Pro Lys Ile Arg Val Pro Leu Lys Val Arg Thr Ala Glu
            450                 455                 460

Asn Lys Leu Ser Asn Arg Phe Phe Pro Tyr Asp Glu Ile Glu Thr Glu
465                 470                 475                 480

Ala Val Leu Ala Ile Asp Asp Asp Ile Ile Met Leu Thr Ser Asp Glu
                485                 490                 495

Leu Gln Phe Gly Tyr Glu Val Trp Arg Glu Phe Pro Asp Arg Leu Val
            500                 505                 510

Gly Tyr Pro Gly Arg Leu His Leu Trp Asp His Glu Met Asn Lys Trp
            515                 520                 525

Lys Tyr Glu Ser Glu Trp Thr Asn Glu Val Ser Met Val Leu Thr Gly
            530                 535                 540

Ala Ala Phe Tyr His Lys Tyr Phe Asn Tyr Leu Tyr Thr Tyr Lys Met
545                 550                 555                 560

Pro Gly Asp Ile Lys Asn Trp Val Asp Ala His Met Asn Cys Glu Asp
                565                 570                 575

Ile Ala Met Asn Phe Leu Val Ala Asn Val Thr Gly Lys Ala Val Ile
            580                 585                 590
```

-continued

```
Lys Val Thr Pro Arg Lys Lys Phe Lys Cys Pro Glu Cys Thr Ala Ile
        595             600             605

Asp Gly Leu Ser Leu Asp Gln Thr His Met Val Glu Arg Ser Glu Cys
        610             615             620

Ile Asn Lys Phe Ala Ser Val Phe Gly Thr Met Pro Leu Lys Val Val
625             630             635             640

Glu His Arg Ala Asp Pro Val Leu Tyr Lys Asp Asp Phe Pro Glu Lys
                645             650             655

Leu Lys Ser Phe Pro Asn Ile Gly Ser Leu
            660             665
```

METHOD AND REAGENTS FOR DIAGNOSING MEMBRANOUS NEPHROPATHY

CROSS-REFERENCE TO RELATED APPLICATIONS

This application claims priority to European Patent Application No. 20213450.8, filed on Dec. 11, 2020, the content of which is hereby incorporated by reference in its entirety.

REFERENCE TO A SEQUENCE LISTING

The present application is accompanied by an ASCII text file as a computer readable form containing the sequence listing, titled, "003837US_SL.txt", created on Nov. 10, 2021, with a file size of 77,921 bytes, which is incorporated by reference in its entirety.

BACKGROUND OF THE INVENTION

Field of the Invention

The present invention relates to a carrier coated with a recombinant polypeptide comprising SEQ ID NO: 1, an isolated autoantibody binding specifically to a polypeptide having SEQ ID NO: 1, a kit comprising the carrier, a method comprising the step detecting the presence or absence of an autoantibody binding specifically to a polypeptide having SEQ ID NO: 1 in a liquid sample comprising antibodies from a subject, a use of an autoantibody binding specifically to a polypeptide having SEQ ID NO: 1 or a polypeptide comprising SEQ ID NO: 1, and a aqueous solution comprising an autoantibody binding specifically to a polypeptide having SEQ ID NO: 1.

Description of the Related Art

Membranous Nephropathy (MN) is an autoimmune disease with a prevalence of 1 to 2/100.000 persons/year and the most common cause of nephrotic syndrome in Caucasian adults. The initial clinical symptoms are edema due to increased renal protein loss, defined as pathologic proteinuria, which is induced by the damage of the renal glomerular filtration barrier.

The clinical course of the disease is variable and ranges from spontaneous remission of proteinuria to end-stage renal disease (ESRD). Patients with spontaneous remission (about 20-25% of patients) usually have an excellent clinical outcome. On the other end of the disease spectrum, about 20% of patients experience ESRD over a time course of ten years, often despite immunosuppressive therapy. The third group of patients presents with persisting, in most cases more moderate levels of proteinuria and stable renal function.

It is difficult to tailor a therapy depending on the individual patient's needs. If a patient belongs to the first group (with spontaneous remission), any medication, usually the administration of immunosuppressive drugs, will see him exposed to the considerable side effects of such treatment even though no such treatment was necessary as could be concluded with hindsight. By contrast, a patient belonging to group 3 may benefit from the administration of strong immunosuppressive drugs at an early stage of the treatment. Therefore, it has been an accepted clinical strategy to simply wait and watch how the clinical disease activity will develop under supportive therapy and to consider, if required, more stringent therapy options during the follow-up time.

In any event, it would be desirable to recognize as early as possible the disease in its early stages and how the course of the disease will develop. In particular, it is important to distinguish autoimmune types of MN, especially related to autoantibodies binding to autoantigens associated with podocytes, from MN linked to other causes such as malignancies, infections and drugs. This way, the best possible treatment can be selected. For example, it may be possible to subject a patient without or with mild symptoms to treatment with low-dose immunosuppressive drugs at an early stage and watch whether he responds positively to such treatment without developing clinical disease activity, thus potentially saving the patient from exposure to harsh immunosuppressive treatment with severe side effects.

The discovery of autoantibodies to phospholipase-A2-receptor (PLA2R) has paved the way to a diagnosis of the disease based on serology (US2013/0280738: Beck, L., Bonegio, R. G., Lambeau, G., Beck, D. M., Powell, D. W., Cummins, T. D., Klein J. B., Salant, D. J. (2009) N. Engl. J. Med. 361(1), 11-21). These autoantibodies can be readily detected in the blood of up to 70% of the patients, meaning that invasive surgery is no longer required to obtain a sample for the diagnosis in these cases.

However, the PLA2R-based assay cannot be used to diagnose the remaining 30% of the patients. Researchers have identified autoantigens and autoantibodies to close this diagnostic gap. It has been reported that autoantibodies to THSD7A may also be detected (U.S. Ser. No. 10/107,810: Tomas N M, Beck L H Jr, Meyer-Schwesinger C, Seitz-Polski B, Ma H, Zahner G, Dolla G. Hoxha E. Helmchen U. Dabert-Gay A S, Debayle D, Merchant M. Klein J, Salant D J. Stahl R A K, Lambeau G. Thrombospondin type-1 domain-containing 7A in idiopathic membranous nephropathy. N Engl J Med. 2014 Dec. 11; 371(24):2277-2287), but the prevalence is only approximately 5%.

Additional autoantigens identified recently include NELL-1 (Sethi S, Debiec H, Madden B. Charlesworth M C. Morelle J, Gross L, Ravindran A, Buob D. Jadoul M. Fervenza F C, Ronco P. Neural epidermal growth factor-like 1 protein (NELL-1) associated membranous nephropathy. Kidney Int. 2020 January; 97(1):163-174) and Semaphorin 3B (Sethi S, Debiec H, Madden B. Vivarelli M. Charlesworth M C. Ravindran A. Gross L. Ulinski T. Buob D, Tran C L, Emma F, Diomedi-Camassei F. Fervenza F C, Ronco P Semaphorin 3B-associated membranous nephropathy is a distinct type of disease predominantly present in pediatric patients Kidney Int 2020 Jun. 10:S0085-2538(20)30640-2).

Exostosin (EXT) (WO20037135; Sethi S, Madden B J, Debiec H. Charlesworth M C. Gross L, Ravindran A. Hummel A M. Specks U, Fervenza F C, Ronco P. Exostosin 1/Exostosin 2-Associated Membranous Nephropathy. J Am Soc Nephrol. 2019 June; 30(6):1123-1136) is another autoantigen. Exostosins are glycosyltransferases that are responsible for the synthesis of the heparan sulfate backbone that add glycosaminoglycan residues to the core protein resulting in the generation of complex polysaccharides. There are five genes that encode the EXT proteins—EXT1, E(T2, EXTL1, EXTL2, and EXTL3. The EXT1 and EXT2 polypeptides show structural similarities, and EXT1 and EXT2 can exist as heterodimers and act as copolymerases in the elongation of the heparin sulfate chain. The heterodimer of EXT1/EXT2 also has increased stability and activity. This is the likely reason that EXT1/EXT2 (in the heterodimer form) are found together in our studies. The EXTL proteins show amino acid sequence homology with EXT1 and EXT2, and are also likely involved in heparan sulfate synthesis although their function is less well known. The EXT proteins are well conserved, especially in their C-terminal regions. Except for EXTL1, the EXT proteins are ubiquitously expressed in various mammalian tissues. EXT proteins are also expressed in podocytes, and a homozygous knockout of EXT1 specifically in podocytes did not lead to significant defects in glomerular filtration, although changes in podocyte architecture and focal thickening of GBM were noted. EXT proteins are transmembrane proteins in endoplasmic reticulum, and whether the EXT1 and EXT2 detected in EXT1/EXT2-associated MN are full-length proteins or represent shed partial or truncated proteins or are proteins with post-transitional modifications needs to be further studied. Finally, mutations in D(T1 and EXT2 are associated with an autosomal dominant disorder, hereditary multiple exostoses, which is one of the most common inherited skeletal disorders. Disorders associated with accumulation of EXT1 and EXT2 other than MN are unknown (BERTELLI et al. Molecular and Cellular Mechanisms for Proteinura in Minimal Change Disease. Front. Med., 11 Jun. 2018, Vol 5, Article 170, pp 1-13. Especially abstract, pg 2, col 2. para 2; US 2006/0040293 A1 (SALONEN et al.) 23 Feb. 2006 (23.02.2006) abstract, [0021]).

While autoantibodies to each of these autoantigens may not be present in the majority of the patients, they rarely emerge together with autoantibodies to PLA2R, meaning that these assays help conclude the diagnosis in PLA2R-negative patients in particular and thus complement the existing assay.

Sethi et al. tried to detect circulating autoantibodies to EXT1/EXT2 in the serum of MN patients using western and native blotting analysis under non-reducing conditions, but failed to detect a circulating autoantibody. It should be mentioned that western blotting has been considered a particularly sensitive method for detecting autoantibodies to MN-relevant autoantigens. This suggests that circulating autoantibodies to Exostosin, which could be detected in blood samples, do not exist.

SUMMARY OF THE INVENTION

The problem underlying the present invention is to provide a serological assay and related reagents that can be used to diagnose MN in patients who do not have a detectable autoantibody to PLA2R or another MN-related autoantigen such as THSD7A or to detect an autoantibody such as a human antibody to SEQ ID NO: 1.

Another problem underlying the present invention is to increase the sensitivity of diagnostics for the diagnosis of MN, preferably for distinguishing autoimmune types of MN, especially related to autoantibodies binding to autoantigens associated with podocytes, from MN linked to other causes such as other autoimmune diseases, malignancies, infections and drugs.

In a $1^{st}$ aspect, the problem underlying the present invention is solved by a diagnostically useful carrier coated with a recombinant polypeptide comprising SEQ ID NO: 1 or a variant thereof, preferably a complex comprising a polypeptide comprising SEQ ID NO: 1 or a variant thereof and a polypeptide comprising SEQ ID NO: 2 or a variant thereof, wherein the carrier is selected from the group comprising a bead, preferably a paramagnetic bead, a test strip, a microtiter plate, a membrane, preferably from the group comprising western blot, line blot and dot blot, a lateral flow device, a glass surface, a slide for microscopy, a microarray and a biochip and is preferably a slide for microscopy.

In a preferred embodiment, the carrier further comprises one or more recombinant polypeptides preferably all polypeptides from the group comprising a complex comprising a polypeptide comprising SEQ ID NO: 1 or a variant thereof and a polypeptide comprising SEQ ID NO: 2 or a variant thereof, a polypeptide comprising SEQ ID NO: 2, SEQ ID NO: 3, a polypeptide comprising SEQ ID NO: 4, a polypeptide comprising SEQ ID NO: 5 and a polypeptide comprising SEQ ID NO: 6 or a variant thereof.

In a preferred embodiment, any immobilized polypeptide is expressed by a cell immobilized on the carrier, preferably a fixed cell, or is a recombinant or isolated polypeptide immobilized on the carrier.

In a preferred embodiment, any immobilized polypeptide is expressed by a cell immobilized on the carrier and the carrier further comprises a mock-transfected cell.

In a preferred embodiment, an autoantibody binding specifically to SEQ ID NO: 1 is bound to the polypeptide comprising SEQ ID NO: 1 or a variant thereof and optionally a secondary antibody comprising a label.

In a $2^{nd}$ aspect, the problem underlying the present invention is solved by an isolated autoantibody binding specifically to SEQ ID NO: 1 or a variant thereof, preferably to a complex comprising a polypeptide comprising SEQ ID NO: 1 or a variant thereof and a polypeptide comprising SEQ ID NO: 2 or a variant thereof, optionally bound to the carrier according to any of embodiments 1 to 5. The autoantibody may be dried or lyophilized.

In a $3^{rd}$ aspect, the problem underlying the present invention is solved by a kit comprising the carrier according to the present invention and one or more from the group comprising a means for detecting an autoantibody binding specifically to SEQ ID NO: 1, preferably a complex comprising a polypeptide comprising SEQ ID NO: 1 or a variant thereof and a polypeptide comprising SEQ ID NO: 2 or a variant thereof, which is preferably a secondary antibody, more preferably a secondary antibody binding specifically to IgG class antibodies, or is a polypeptide comprising SEQ ID NO: 1, wherein the means preferably comprises a label, a means for capturing an autoantibody binding specifically to SEQ ID NO: 1 or to a complex comprising a polypeptide comprising SEQ ID NO: 1 or a variant thereof and a polypeptide comprising SEQ ID NO: 2 or a variant thereof, a washing buffer, a mounting medium, a dilution buffer, a positive control, a negative control, a calibrator, preferably a set comprising three or more calibrators, and a recombinant polypeptide comprising SEQ ID NO: 1 or a variant thereof.

In a $4^{th}$ aspect, the problem underlying the present invention is solved by a method for the diagnosis of MN comprising the step of detecting the presence or absence of an autoantibody binding specifically to SEQ ID NO: 1, preferably to a complex comprising a polypeptide comprising SEQ ID NO: 1 or a variant thereof and a polypeptide comprising SEQ ID NO: 2 or a variant thereof, in a liquid sample comprising antibodies from a subject.

In a preferred embodiment, the autoantibody is an IgG class antibody.

In a preferred embodiment, the sample is selected from the group comprising whole blood, serum and plasma. Preferably the sample is from a mammalian, more preferably human patient.

In a preferred embodiment, the antibody is detected using a method from the group comprising immunodiffusion, immunoelectrophoresis, light scattering immunoassays, agglutination, labeled immunoassays such as those from the group comprising radiolabeled immunoassays, enzyme immunoassays such as colorimetric assays, chemiluminescence immunoassays and immunofluorescence, more preferably immunofluorescence.

In a preferred embodiment, the method further comprises detecting the presence or absence of an autoantibody from the group, preferably all autoantibodies from the group comprising an autoantibody binding specifically to a complex comprising a polypeptide comprising SEQ ID NO: 1 and a polypeptide comprising SEQ ID NO: 2, an autoantibody binding specifically to SEQ ID NO: 2, an autoantibody binding specifically to SEQ ID NO: 3, an autoantibody binding specifically to SEQ ID NO: 4, an autoantibody binding specifically to SEQ ID NO: 5 and an autoantibody binding specifically to SEQ ID NO: 6.

In a 5$^{th}$ aspect, the problem underlying the present invention is solved by a use of an autoantibody binding specifically to SEQ ID NO: 1 or to a complex comprising a polypeptide comprising SEQ ID NO: 1 and a polypeptide comprising SEQ ID NO: 2 or the carrier according to the present invention for the serological diagnosis of MN.

In a 6$^{th}$ aspect, the problem underlying the present invention is solved by a use of a polypeptide comprising SEQ ID NO: 1 or of a complex comprising a polypeptide comprising SEQ ID NO: 1 or a variant thereof and a polypeptide comprising SEQ ID NO: 2 or a variant thereof and a secondary antibody for the manufacture of a diagnostic kit.

In a 7$^{th}$ aspect, the problem underlying the present invention is solved by a use of an autoantibody binding specifically to SEQ ID NO: 1 or to a complex comprising a polypeptide comprising SEQ ID NO: 1 and a polypeptide comprising SEQ ID NO: 2 or a recombinant antibody binding specifically to SEQ ID NO: 1 or to a complex comprising a polypeptide comprising SEQ ID NO: 1 and a polypeptide comprising SEQ ID NO: 2 as a positive control for the detection of an autoantibody binding specifically to SEQ ID NO: 1 or to a complex comprising a polypeptide comprising SEQ ID NO: 1 and a polypeptide comprising SEQ ID NO: 2 in a sample, preferably for the diagnosis of MN.

In an 8$^{th}$ aspect, the problem underlying the present invention is solved by an aqueous solution comprising an autoantibody binding specifically to SEQ ID NO: 1 or to a complex comprising a polypeptide comprising SEQ ID NO: 1 and a polypeptide comprising SEQ ID NO: 2. In a preferred embodiment, the aqueous solution comprises a sample from a human patient having MN. In another preferred embodiment, the solution comprises a non-physiological buffer or a physiological buffer at concentrations above physiological levels and more preferably has a pH between 5 and 9, preferably 6 to 8.

In a 9$^{th}$ aspect, the problem underlying the present invention is solved by a device for removing an autoantibody to SEQ ID NO: 1, preferably a complex comprising SEQ ID NO: 1 and SEQ ID NO: 2, from blood, preferably serum of an MN patient, wherein the device comprises a carrier coated with SEQ ID NO: 1, preferably a complex comprising SEQ ID NO: 1 and SEQ ID NO: 2 or a variant thereof.

In a 10$^{th}$ aspect, the problem underlying the present invention is solved by a ex vivo method for removing an autoantibody to SEQ ID NO: 1, preferably a complex comprising SEQ ID NO: 1 and SEQ ID NO: 2, from blood, preferably serum of an MN patient.

DETAILED DESCRIPTION OF THE INVENTION

Figure 1:
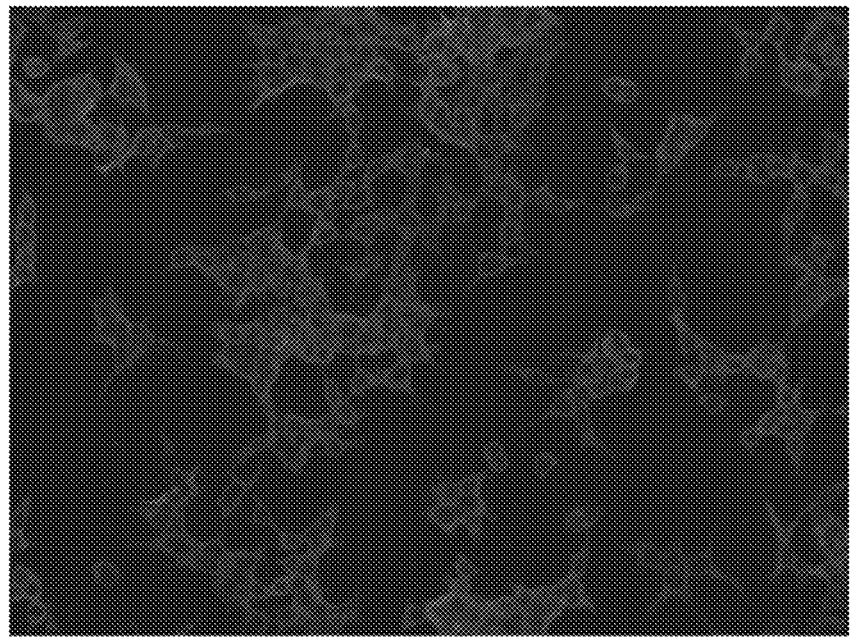
FIG. 1 shows the detection of circulating autoantibodies using an immunofluorescence assay. A mock-transfected cell expressing no Exostosin is shown.

The present invention is based on the surprising finding of the inventors that autoantibodies to EXT2 and EXT1/2 are present and detectable in blood samples from MN patients, but not in samples from healthy subjects. They can be detected using immunoassays and can be used to set up serological immunoassays for the diagnosis of MN. A carrier comprising immobilized EXT2 or EXT1/2 may be used for detecting such antibodies.

Furthermore, the present invention is based on the surprising finding that it is possible to distinguish between autoimmune and non-autoimmune MN using a polypeptide comprising SEQ ID NO: 1 or a variant thereof or a complex comprising a polypeptide comprising SEQ ID NO: 1 and a complex comprising a polypeptide comprising SEQ ID NO: 2 or a variant thereof.

According to the present invention, a polypeptide comprising SEQ ID NO: 1 or a variant thereof is used to detect an autoantibody to SEQ ID NO: 1, for example by coating the diagnostically useful carrier according to the present invention with a polypeptide comprising SEQ ID NO: 1 or a variant thereof or by using a soluble polypeptide comprising SEQ ID NO: 1 or a variant thereof which may be detected if bound to the antibody. Optionally, the carrier may comprise another MN-related autoantigen, preferably spatially separate from the polypeptide comprising SEQ ID NO: 1. Optionally, the carrier may comprise a control indicating it has been contacted with a serum sample. Optionally, the carrier may comprise a control indicating it has been contacted with a secondary antibody, preferably a secondary antibody binding to human antibodies, more preferably to human IgG antibodies. Optionally, the carrier may comprise at least one calibrator, preferably a set comprising at least three calibrators. Calibrators are described in the art, for example The Immunoassay Handbook, 3$^{rd}$ edition, edited by David Wild, Elsevier, 2005. In a preferred embodiment, any sequence referred to is understood to be presented as part of a polypeptide or a similar form which may be used to detect the autoantibody of interest. In particular, this applies to the sequences of other MN-related autoantigen. In a preferred embodiment, the term "other MN-related autoantigen", as used herein, refers to one or more, preferably all from the group comprising a complex comprising SEQ ID NO: 1 and SEQ ID NO: 2, SEQ ID NO: 2, SEQ ID NO: 3, SEQ ID NO: 4, SEQ ID NO: 5 and SEQ ID NO: 6. Any uniprot database sequences referred to herein refer to the sequences available on Oct. 20, 2021.

Preferably a polypeptide comprising SEQ ID NO: 1 or a complex comprising SEQ ID NO: 1 and SEQ ID NO: 2 or a variant thereof is immobilized on a solid phase of the carrier. It may be directly immobilized on the solid phase when contacted with the sample, but a competitive assay, a capture bridge assay, an immunometric assay, a class-specific second antibody on the solid phase, a class capture assay, direct or indirect may also be used. The principle of each of these formats is detailed in The Immunoassay Handbook, 3$^{rd}$ edition, edited by David Wild, Elsevier, 2005. More preferably, the solid phase is a test strip or a well of a microtiter plate for ELISA, preferably a well of a microtiter plate for ELISA.

In a preferred embodiment, any polypeptide immobilized on a solid phase, preferably of a carrier, may be configured for immobilization on said phase. For example, the polypeptide may not actually yet be immobilized, but may be associated with a ligand which binds to binding partner associated with the solid phase. The ligand may be biotin and the binding partner streptavidin or vice versa. Upon mixing the polypeptide and the solid phase in a liquid solution, the polypeptide will immediately bind to the solid phase. For example, the polypeptide may be configured for immobilization on a microtiter plate well.

In a preferred embodiment, a carrier comprising a polypeptide comprising SEQ ID NO: 1 or a complex comprising SEQ ID NO: 1 and SEQ ID NO: 2 or a variant thereof may be used to detect an autoantibody to SEQ ID NO: 1 or to a complex comprising SEQ ID NO: 1 and SEQ ID NO: 2 in a liquid sample, preferably blood sample, more preferably serum or plasma sample.

The teachings of the present invention may not only be carried out using the polypeptides, in particular a polypeptide comprising the native sequence of a polypeptide referred to such as Exostosin 2 (SEQ ID NO: 1) or nucleic acids having the exact sequences referred to in this application explicitly, for example by function, name, sequence or accession number, or implicitly, but also using variants of such polypeptides or nucleic acids. Exemplary variants include SEQ ID NO: 9, SEQ ID NO: 10, bovine (Uniprot O77783, uniprot.org/uniprot/O77783), chimpanzee (A0A6D2WAN1, uniprot.org/uniprot/A0A6D2WAN1), dog (A0A6D2WAN1, uniprot.org/uniprot/A0A6D2WAN1), horse (A0A5F5Q0R9, uniprot.org/uniprot/A0A5F5Q0R9), lion (A0A6P61AG1, uniprot.org/uniprot/A0A6P61AG1), pig (A0A480SE83, uniprot.org/uniprot/A0A480SE83), turkey (A0A7L0W6P6, uniprot.org/uniprot/A0A7L0W6P6) and sheep (A0A6P7EVF0, uniprot.org/uniprot/A0A6P7EVF0) Exostosin 2.

In a preferred embodiment, the term "variant", as used herein, may refer to at least one fragment of the full length sequence referred to, more specifically one or more amino acid or nucleic acid sequence which is, relative to the full-length sequence, truncated at one or both termini by one or more amino acids. Such a fragment comprises or encodes for a peptide having at least 6, 7, 8, 10, 12, 15, 20, 25, 50, 75, 100, 150, 200, 300, 400, 500, 600, 620, 640, 660, 680 or 700 successive amino acids of the original sequence or a variant thereof. The total length of the variant may be at least 6, 7, 8, 9, 10, 11, 12, 20, 25, 30, 40, 50, 60, 70, 80, 90, 100, 200, 300, 400, 500, 600, 640, 660, 680, 700 or 718 or more amino acids.

The term "variant" relates not only to at least one fragment, but also to a polypeptide or a fragment thereof comprising amino acid sequences that are at least 40, 50, 60, 70, 75, 80, 85, 90, 92, 94, 95, 96, 97, 98, 99, 99.3, 99.4, 99.5, 99.6, 99.7, 99.8 or 99.9, preferably at least 99.3% identical to the reference amino acid sequence referred to or the fragment thereof, wherein amino acids other than those essential for the biological activity, for example the ability of an antigen to bind to an (auto) antibody, or the fold or structure of the polypeptide are deleted or substituted and/or one or more such essential amino acids are replaced in a conservative manner and/or amino acids are added such that the biological activity of the polypeptide is preserved. The state of the art comprises various methods that may be used to align two given nucleic acid or amino acid sequences and to calculate the degree of identity. see for example Arthur Lesk (2008), Introduction to bioinformatics, Oxford University Press, 2008, 3$^{rd}$ edition. In a preferred embodiment, the ClustalW software (Larkin, M. A., Blackshields, G., Brown, N. P., Chenna, R., MeGettigan, P. A., McWilliam, H., Valentin, F., Wallace, I. M., Wilm, A., Lopez, R., Thompson, J. D., Gibson, T. J., Higgins, D. G. (2007). Clustal W and Clustal X version 2.0. Bioinformatics, 23, 2947-2948) is used using default setting. State of the art literature will be used by the skilled one to design variants, for example Behnert, A., Fritzler, M. J., Teng, B., Zhang, M., Bollig, F., Haller, H., Skoberne, A., Mahler, M., and Schiffer, M. (2013) (PLOS, 8 (4) e61669), and their results, in particular the epitopes in Table 1 and FIG. 2, may be used to guide the design of variants. Additional guidance may be found in US2019183969 AL.

In a preferred embodiment, the polypeptide and variants thereof may, in addition, comprise chemical modifications, for example isotopic labels or covalent modifications such as glycosylation, phosphorylation, acetylation, decarboxylation, citrullination, methylation, hydroxylation and the like. The person skilled in the art is familiar with methods to modify polypeptides. Any modification is designed such that it does not abolish the biological activity of the variant.

Moreover, variants may also be generated by N- or/and C-terminal fusion of polypeptides, fragments or variants thereof with other known polypeptides or variants thereof, preferably from the group comprising linkers and affinity tags, optionally with protease cleavage sites, and comprise active portions or domains, preferably having a sequence identity of at least 70, 75, 80, 85, 90, 92, 94, 95, 96, 97, 98 or 99% when aligned with the active portion of the reference sequence, wherein the term "active portion", as used herein, refers to an amino acid sequence, which is less than the full length amino acid sequence or, in the case of a nucleic acid sequence, codes for less than the full length amino acid sequence, respectively, and/or is a variant of the natural sequence, but retains at least some of the biological activity. Preferably the active portion is an active portion of SEQ ID NO: 1, preferably a complex comprising SEQ ID NO: 1 and SEQ ID NO: 2 or a variant thereof. A linker may be a flexible stretch of amino acids, for example rich in glycine and serine residues, preferably comprising 1 to 50, 3 to 30 or 4 to 20 amino acids. Examples of protease cleavage sites comprise Thrombin and prescission protease cleavage sites.

The variant of the polypeptide has biological activity. In a preferred embodiment, such biological activity is the ability to bind specifically to an autoantibody binding specifically to the autoantigen of interest, preferably from the group comprising SEQ ID NO: 1, SEQ ID NO: 2, a complex comprising a SEQ ID NO: 1 and SEQ ID NO: 2, SEQ ID NO: 3, SEQ ID NO: 4, SEQ ID NO: 5 and SEQ ID NO: 6, more preferably SEQ ID NO: 1, as found in a patient suffering from an autoimmune disease associated with such autoantibody, preferably MN. For example, whether or not a variant of the polypeptide has such biological activity may be checked by determining whether or not it binds specifically to an autoantibody from a sample of an MN patient comprising an autoantibody binding specifically to wild type autoantigen, preferably as determined by indirect immunofluorescence as described in the experimental section of this application.

According to the present invention, a polypeptide, preferably the polypeptide comprising SEQ ID NO: 1 or a variant thereof, may be a recombinant protein. In a preferred embodiment, the term "recombinant", as used herein, refers to a polypeptide produced using genetic engineering approaches at any stage of the production process, for example by fusing a nucleic acid encoding the polypeptide to a strong promoter for overexpression in cells or tissues or by engineering the sequence of the polypeptide itself. The person skilled in the art is familiar with methods for engineering nucleic acids and polypeptides encoded (for example, described in Sambrook, J., Fritsch, E. F. and Maniatis, T. (1989), Molecular Cloning, CSH or in Brown T. A. (1986), Gene Cloning—an introduction, Chapman & Hall) and for producing and purifying native or recombinant polypeptides (for example Handbooks "Strategies for Protein Purification", "Antibody Purification", published by GE Healthcare Life Sciences, and in Burgess, R. R., Deutscher, M. P. (2009): Guide to Protein Purification). In another preferred embodiment, a polypeptide provided or used according to the present invention such as a polypeptide comprising SEQ ID NO: 1 or a complex comprising a polypeptide comprising SEQ ID NO. 1 and a complex comprising SEQ ID NO: 2 or a variant thereof or an antibody is an isolated polypeptide, wherein the term "isolated" means that the polypeptide has been enriched compared to its state upon production using a biotechnological or synthetic approach and is preferably pure, i.e. at least 60, 70, 80, 90, 95 or 99 percent of the polypeptide in the respective liquid consists of said polypeptide as judged by SDS polyacrylamide gel electrophoresis followed by Coomassie blue staining and visual inspection. Preferably any polypeptide on a carrier used as a means to capture an antibody is pure.

According to the present invention, a medical or diagnostic device such as the diagnostically useful carrier may be prepared by expressing a recombinant variant of SEQ ID NO: 1 comprising an affinity tag, optionally with an artificial linker which may include a protease cleavage site, in a cell such as a eukaryotic or prokaryotic cell, contacting the expressed variant with a ligand binding specifically to the affinity tag, which ligand is immobilized on a solid phase, washing the solid phase such that non-specifically bound material from the cell is removed and eluting the expressed variant from the solid phase, preferably by adding an excess of non-immobilized ligand. The variant may then be immobilized on the device. Optionally, the affinity tag may be removed by contacting the variant with a protease, preferably a protease recognizing the protease cleavage site, before the immobilization. The affinity tag may be selected from the group of tags comprising His, 18A, ACP, Aldehyd, Avi, BCCP, Calmodulin, Chitin binding protein, E-Tag, ELK16, FLAG, flash, poly glutamate, poly aspartate, GST, GFP, HA, Isope, maltose binding protein, myc, nus, NE, ProtA, ProtC, Tho1d4, S-Tag, SnoopTag, SpyTag, SofTag, Streptavidin, Strep-tag II, T7 Epitope Tag, TAP, TC, Thioredoxin, Ty, VS, VSV and Xpress Tag. Useful proteases include, but are not limited to TEV, Thrombin, Faktor Xa or Enteropeptidase. Suitable linkers are part of vectors, for example pET vector series (Novagen).

According to the present invention, a cell is provided which overexpresses a polypeptide comprising SEQ ID NO: 1 or a variant thereof, preferably in combination with another cell which overexpresses the sequence of another MN-related autoantigen in addition or a variant thereof, preferably SEQ ID NO: 2, or a variant thereof. In a preferred embodiment, the term "overexpressing", as used herein, means that the cell has been transfected with a nucleic acid, either transiently or stably in the sense that the nucleic acid has been incorporated in the genome of the cell, that comprises a nucleic acid sequence encoding a polypeptide comprising SEQ ID NO: 1 or another MN-related autoantigen or a variant thereof under the control of a promotor. The cell overexpressing a polypeptide comprising SEQ ID NO: 1 or a variant thereof may additionally overexpress a polypeptide comprising SEQ ID NO: 2 or a variant thereof such that a complex comprising both polypeptides is formed. Consequently, the transfected cell expresses more polypeptide recognized by the autoantibody to be detected than the same type of cell normally would, probably at least 10, 20, 30, 50, 100, 200 or 500% more as judged by quantitative Western Blot. The promotor may be an inducible promotor, which allows for the induction of expression by addition of an inducer. The person skilled in the art is familiar with protocols and vectors for transiently overexpressing a polypeptide in a eukaryotic cell, for example the pTriEx system from Novagen and with protocols and vectors for stably transfecting a eukaryotic cell, for example the pcDNA™4/TO vector system from Invitrogen.

In a preferred embodiment, a fixed mammalian cell may be used. In a preferred embodiment, the term "fixed" cell, as used herein, refers to a cell that has been treated with a reactive chemical compound to the effect that the cell is no longer metabolically active, but still presents its epitopes for immunostaining with antibodies and their subsequent detection, for example by fluorescence. More preferably, the reactive chemical compound is selected from the group comprising acetone, formalin, methanol and ethanol or mixtures thereof, preferably all of them. The person skilled in the art is familiar with protocols that may be used to prepare fixed cells. Essentially, the cell which is attached to a solid support is washed by using washing buffer, followed by contacting with the reactive compound, for example immersion. Pure acetone or formalin or aqueous dilutions of the reactive chemical compound may be used.

According to the present invention, the cell is on a carrier for microscopic immunofluorescence analysis. Such a carrier may be a glass slide. The cell on the glass slide may be covered with a mounting buffer. A mounting medium is a liquid which helps maintain a near physiological pH to maintain the molecular structure of any diagnostically relevant molecular and their epitopes, is compatible with the emission of a fluorescence signal and prevents a premature loss of fluorescence due to bleaching of the fluorophore. At the same time its optical properties are matched with other buffers used, in particular its refractive index which allows for an efficient microscopic fluorescence analysis. The mounting medium comprises a base component, preferably selected from the group comprising water, glycerol, natural oil or plastic or a mixture thereof, preferably water and glycerol. It may further comprise an antifade constituent which may reduce bleaching, preferably selected from the group comprising NPG (N-propyl gallate), DABCO (1,4-diazabicyclo[2.2.2]octane), 4POBN ((4-Pirydyl-1-oxide)-

N-tert-butyl nitrone) and PPD (P-phenylanediamine). Various compositions and methods are described in the state of the art, for example in "Mountants and Antifades", published by Wright Cell Imaging Facility, Toronto Western Research Institute University Health Network, (https://de-.scribd.com/document/47879592/Mountants-Antifades), Krenek et al. (1989) Comparison of antifading agents used in immunofluorescence, J. Immunol. Meth 117, 91-97 and Naim et al. (1969) Microphotometry in lmmunofluorescence, Clin. Exp. Immunol. 4, 697-705.

A cover glass may be placed on top of the composition comprising the sample and the mounting medium. Slides with cover glasses (FB 112d-1005-1 or ZZ 3000-0112) are available from EUROIMMUN Medizinische Labordiagnostika, AG. However, any carrier compatible with microscopic analysis of the fluorescence pattern may be used. The carrier may comprise a mock-transfected cell, which has been transfected with the same vector as the cell overexpressing a polypeptide comprising SEQ ID NO: 1, but without the nucleic acid encoding for the latter. Such mock-transfected cell may serve as a negative control. The carrier is configured for analysis using an immunofluorescence microscope.

In a preferred embodiment, the carrier may comprise a field comprising the cell according to the invention. In addition the carrier may comprise additional fields. The fields are preferably surrounded by a hydrophobic surface and preferably spatially separate from each other. Each of these fields may comprise a cell overexpressing another MN-related autoantigen or a variant thereof. A field may comprise a section of mammalian kidney tissue, preferably primate.

Preferably a polypeptide comprising SEQ ID NO: 1, preferably in complex with a polypeptide comprising SEQ ID NO: 2 or a variant thereof is immobilized on a solid phase of the carrier. It may be directly immobilized on the solid phase when contacted with the sample, but a competitive assay, a capture bridge assay, an immunometric assay, a class-specific second antibody on the solid phase, a class capture assay, direct or indirect may also be used. The principle of each of these formats is detailed in The Immunoassay Handbook, $3^{rd}$ edition, edited by David Wild, Elsevier, 2005. More preferably, the solid phase is a test strip or a well of a microtiter plate for ELISA, preferably a well of a microtiter plate for ELISA.

In a preferred embodiment, a secondary antibody is an antibody binding specifically to all antibodies from an antibody class, preferably a mammalian antibody class, more preferably human antibody class such as IgG. Secondary antibodies typically recognize the constant domain of said class, but may also recognize other epitopes shared by antibodies from the class of interest, for example a conformational epitope across the 3D structure. A wide range of them is commercially available, for example from Thermo Fisher. It may be a monoclonal or a polyclonal antibody. In a preferred embodiment, the term "recognized", as used herein, means that the secondary antibody binds specifically to the antibody or antibodies to be detected. A secondary antibody may bind specifically to all isotypes from the antibody class. For example, a secondary antibody to IgG class antibodies may bind to IgG1, IgG2, IgG3 and IgG4 isotypes. This may be achieved by using as a secondary antibody to the class, preferably to IgG class antibodies, a mixture comprising an antibody binding specifically to each IgG isotype or a single antibody which reacts with all isotypes of interest. The use of secondary antibodies is explained in Kruger, N. J., Detection of Polypeptides on Blots Using Secondary Antibodies, in The Protein Protocols Handbook (ed. J. M. Walker), page 967, volume 1996, Springer. Briefly, such secondary antibodies may be generated by immunizing a laboratory animal with the antibody to be recognized or a mixture of the antibodies to be recognized.

The autoantibody to be detected or a secondary antibody used binds preferably specifically to the autoantigen or antibody to be detected, respectively. In a preferred embodiment, the term "binding specifically", as used herein, preferably means that the binding reaction is stronger than a binding reaction characterized by a dissociation constant of $1 \times 10^{-5}$ M, more preferably $1 \times 10^{-7}$ M, more preferably $1 \times 10^{-8}$ M, more preferably $1 \times 10^{-9}$ M, more preferably $1 \times 10^{-10}$ M, more preferably $1 \times 10^{-11}$ M, more preferably $1 \times 10^{-12}$ M, as determined by surface plasmon resonance using Biacore equipment at 25° C. in PBS buffer at pH 7.

In a preferred embodiment, the cell is bound to an autoantibody to SEQ ID NO: 1, preferably to a complex comprising SEQ ID NO: 1 and SEQ ID NO: 2, and a secondary antibody is bound to the antibody. In a more preferred embodiment, the secondary antibody recognizes IgG class antibodies. For immunofluorescence analysis, the secondary antibody may comprise a detectable fluorescent label, more preferably FITC (fluorescein isothiocyanate).

In a preferred embodiment, the method according to the present invention comprises the step providing the carrier according to the present invention. The carrier may then be contacted with the sample suspected of comprising the autoantibody under conditions allowing for binding of any autoantibodies to the cell and SEQ ID NO: 1 or variant thereof expressed by the cell. The sample may then be removed and the carrier with the cell may be washed to remove any remaining sample. A secondary autoantibody or similar reagent or means binding to the autoantibody and carrying a detectable label such as a fluorescent dye may then be contacted with the carrier under conditions allowing formation of a complex between any bound autoantibody and the secondary antibody. The carrier may be washed then to remove non-bound secondary antibody. Finally, the presence of the autoantibody is detected by checking whether the secondary antibody may be detected, preferably by immunofluorescence, more preferably emitted by fluorescein or a derivative thereof, most preferably FITC.

In a preferred embodiment, the term "diagnosis", as used herein, is to be used in its broadest possible sense and may to any kind of procedure aiming to obtain information instrumental in the assessment whether a patient, known or an anonymous subject from a cohort, suffers or is likely or more likely than the average or a comparative subject, the latter preferably having similar symptoms, to suffer from certain a disease or disorder in the past, at the time of the diagnosis or in the future, to find out how the disease is progressing or is likely to progress in the future or to evaluate the responsiveness of a patient or patients in general with regard to a certain treatment, for example the administration of immunosuppressive drugs, or to find out whether a sample is from such a patient. Such information may be used for a clinical diagnosis, but may also be obtained by an experimental and/or research laboratory for the purpose of general research, for example to determine the proportion of subjects suffering from the disease in a patient cohort or in a population. In other words, the term "diagnosis" comprises not only diagnosing, but also prognosticating and/or monitoring the course of a disease or disorder, including monitoring the response of one or more patients to the administration of a drug or candidate drug, for example to determine its efficacy. The use of an MN-related autoantibody to assay for such purposes has been described in the art, for example in Fervenza F C et al. Rituximab or Cyclosporine in the Treatment of Membranous Nephropathy. N Engl J Med. 2019 Jul. 4: 381 (1): 36-46. While the result may be assigned to a specific patient for clinical diagnostic applications and may be communicated to a medical doctor or institution treating said patient, this is not necessarily the case for other applications, for example in diagnostics for research purposes, where it may be sufficient to assign the results to an sample from an anonymized patient. In another preferred embodiment, the detection of an autoantibody to SEQ ID NO: 1, optionally coexpressed or in complex with SEQ ID NO: 2, is considered to imply a definitive diagnosis of MN because of the presence of the autoantibody. In a preferred embodiment, the method may aid in the diagnosis of MN or serve for identifying an individual having an increased risk, compared to an average subject, of suffering from MN in the present or future. In a preferred embodiment, the method and reagents according to the present invention are used to determine whether a kidney transplantation is likely to be successful. In another preferred embodiment the method and reagents according to the present invention are used to determine whether a kidney from a subject may be successfully transplanted to a recipient in need of such a transplant. Both the donor and the recipient may be tested.

In a preferred embodiment, the methods and products according to the present invention may be used for interaction studies, including determining whether a drug candidate or other compound may interfere with the binding of an autoantibody to SEQ ID NO: 1 or may affect any downstream process or the strength of its binding to its target. In preferred embodiment, they may be used for monitoring the immune response, more preferably the emergence and/or titer of antibodies to SEQ ID NO: 1, following the administration of an immunogenic composition comprising SEQ ID NO: 1 or an immunogenic variant thereof, for example to a mammal, which may be a mammal other than a human such as a laboratory animal.

In another preferred embodiment, the methods and products according to the present invention may be used for determining the concentration of an antibody to a polypeptide having SEQ ID NO: 1, preferably in complex with a polypeptide having SEQ ID NO: 2. In a more preferred embodiment, said antibody is an autoantibody from an MN patient. In another preferred embodiment, said antibody is a recombinant antibody which binds to a polypeptide having SEQ ID NO: 1, optionally to a complex comprising a polypeptide comprising SEQ ID NO: 1 and a polypeptide comprising SEQ ID NO: 2, but is recognized by a secondary antibody binding specifically to human IgG class antibodies, preferably IgG1, IgG2, IgG3 and IgG4 isotypes. In a more preferred embodiment, such a concentration needs to be determined for the purposes of research, for the preparation or for monitoring the quality of reagents, animal models or devices that may or may not be used for the diagnosis of MN.

In many cases the mere detection of the autoantibody, in other words determining whether or not detectable levels of the antibody are present in the sample, is sufficient for the diagnosis. If the autoantibody can be detected, this will be information instrumental for the clinician's diagnosis and indicates an increased likelihood that the patient suffers from a disease.

The person skilled in the art will appreciate that a clinician does usually not conclude whether or not the patient suffers or is likely to suffer from a disease, condition or disorders solely on the basis of a single diagnostic parameter, but needs to take into account other aspects, for example the presence of other autoantibodies, markers, blood parameters, clinical assessment of the patient's symptoms or the results of medical imaging or other non-invasive methods such as polysomnography, to arrive at a conclusive diagnosis. See Baenkler H. W. (2012), General aspects of autoimmune diagnostics, in Renz, H., Autoimmune diagnostics, 2012, de Gruyter, page 3. The value of a diagnostic agent or method may also reside the possibility to rule out one disease, thus allowing for the indirect diagnosis of another. In a preferred embodiment, the meaning of any symptoms or diseases referred to throughout this application is in line with the person skilled in the art's understanding as of the filing date or, preferably, earliest priority date of this application as evidenced by text books and scientific publications. It should be mentioned that the inventive methods or uses or products, taken alone, cannot be used to arrive at a definite, final diagnosis.

In a preferred embodiment, the term "diagnosis" may also refer to a method or agent used to choose the most promising treatment regime for a patient. In other words, the method of agent may relate to selecting a treatment regimen for a subject. For example, the detection of autoantibodies may indicate that an immunosuppressive therapy is to be selected, which may include administrating to the patient one or more immunosuppressive drugs. Suitable immunosuppressive drugs are disclosed in U.S. Pat. No. 10,107,810 B2, paragraph [0091].

In a preferred embodiment, any information or data demonstrating the presence or absence of the autoantibody may be communicated to the patient or a medical doctor treating the patient, preferably by telephone, by fax, in a written form or via the internet, for example as an email or text message.

In a preferred embodiment, the autoantibody is considered to be present in a sample if an assay based on at least one method yields a positive result, which method would normally yield a negative result if a sample from a healthy average person such as blood donor is examined. The person skilled in the art is aware that different methods occasionally yield different results. More preferably, in such a case the autoantibody is deemed to be present if at least one method yields a positive result, even if at least one other method may give a negative result. In a most preferred embodiment, immunofluorescence, preferably carried out as described in the examples, is considered the most reliable method and is used in case of otherwise inconclusive results to determine whether the autoantibody is present.

In a preferred embodiment, the term "autoantibody", as used herein, refers to an antibody binding specifically to an endogenous molecule of the animal, preferably mammal, more preferably human, which produces said autoantibody, wherein the level of such antibody is more preferably elevated compared to the average healthy subject. The autoantibody may have the sequence of an antibody's constant regions from the animal, preferably human, making it, but the variable region is able to bind specifically to the endogenous molecule of the animal, more specifically SEQ ID NO: 1 or an MN-related autoantigen. In a preferred embodiment, the autoantibody is isolated and/or purified from a sample, preferably tissue, serum, plasma, blood or CSF from the animal, preferably human. The autoantibody is a polyclonal, native antibody from the animal rather than a synthetic or recombinant antibody. The autoantibody may be part of a composition which comprises a preservative such as azide or a protease inhibitor. The autoantibody may be in a diluted blood sample, preferably diluted using an aqueous buffer. The autoantibody may serve as a positive control to develop a diagnostic kit or reagent or confirm the quality or diagnostic kit or may be included in the kit as a positive control or as a reagent, for example as a ligand competing with an autoantibody to be detected. It may be labeled with a detectable label.

The method according to the present invention is preferably an in vitro method.

In a preferred embodiment, a detectable label may be selected from the group comprising an enzymatically active, chemiluminescent, fluorescent and radioactive label. A variety of labels are commercially available and known in the art, for example in The Immunoassay Handbook, $3^{rd}$ edition, edited by David Wild, Elsevier, 2005.

According to the present invention, a kit is provided, comprising the cell or the carrier and further comprising one or more, preferably all reagents from the group comprising a secondary antibody, preferably labeled with a detectable label, a washing solution, a positive control, a negative control, a detergent, a cover glass, a mounting medium and a physiological salt solution, preferably PBS, or salt required to prepare it. In a preferred embodiment, the positive control is a diluted sample, preferably serum or CSF, from a patient suffering from MN or a monoclonal antibody to a polypeptide comprising SEQ ID NO: 1 and/or a complex comprising a polypeptide comprising SEQ ID NO: 1 and a polypeptide comprising SEQ ID NO: 2. The negative control may be a diluted sample from a healthy subject, for example a blood donor, preferably a blood sample such as a serum or plasma sample. The kit may comprise instructions how to carry out the assay and how to diagnose MN using the inventive teachings. Preferably, the secondary antibody is a secondary antibody to IgG class antibodies, preferably human IgG class antibodies. According to the invention, the kit may be used to detect the presence or absence of an antibody to SEQ ID NO: 1 in a blood sample, preferably mammalian, more preferably human blood sample. The blood sample may comprise a representative set of antibodies. The blood sample may be selected from the group comprising whole blood, serum, plasma and capillary blood. The kit may comprise a secondary antibody recognizing human IgG class antibodies and a polypeptide comprising SEQ ID NO: 1 or a variant thereof, wherein the polypeptide is preferably labeled. The kit may comprise the carrier according to the present invention and a polypeptide comprising SEQ ID NO: 1 or a variant thereof, wherein the polypeptide is preferably labeled.

In a preferred embodiment, the present invention provides a use of the cell, the polypeptide, the carrier for the manufacture of kit a composition for the diagnosis of a disease.

In a preferred embodiment, any method or use according to the present invention may be intended for a non-diagnostic use, i.e. determining the presence of an autoantibody to binding to a polypeptide having SEQ ID NO: 1, preferably a complex comprising a polypeptide having SEQ ID NO: 1 and a polypeptide having SEQ ID NO: 2, for a use other than diagnosing a patient. For example, the method or use may be for testing in vitro the efficiency of a medical device designed to remove an autoantibody from a patient's blood, wherein the testing is performed on a liquid other than patient's blood. After the use of the medical device with a patient, its capacity to remove autoantibody may be checked by running a solution comprising antibody to a polypeptide having SEQ ID NO: 1 through the device, followed by use of the method according to the present invention to confirm that less or no antibody is in the solution that has been passed through the device, i.e. showing that the device has still the capacity to remove antibody from the solution.

In another preferred embodiment, the method may be for confirming the reliability of a diagnostic assay and may involve detecting an antibody to a polypeptide having SEQ ID NO: 1 in a solution, which is not a sample from a patient who requires a diagnosis, but is known to comprise an antibody to a polypeptide having SEQ ID NO: 1, preferably at a known concentration. For example, it may be a recombinant antibody or a sample diluted in a dilution buffer such as PBS from an anonymous patient whose identity cannot be traced back. Alternatively, the solution may be a negative control not comprising the antibody to check the background. Such method may be run in parallel with, after or before a diagnostic method. In a preferred embodiment, any method or use according to the present invention may be intended for generating an autoantibody profile, preferably for detecting a disease in a mammal, preferably a human.

In a preferred embodiment, any method or use according to the present invention may be for identifying a subject at risk of suffering from or developing a disease and/or a tumor.

In a preferred embodiment, the method may be for detecting an antibody, preferably autoantibody in a solution which is not a sample from a mammal to be diagnosed or for the purpose of providing a diagnosis, in particular not a diagnosis of MN.

In a preferred embodiment, the present invention provides an apparatus for analyzing a sample from a patient to detect an autoantibody against a polypeptide having SEQ ID NO: 1, indicating an increased likelihood of a disease or of developing a disease, comprising:

a. a carrier, which contains a means for capturing the autoantibody from the sample when the sample is contacted with the carrier, wherein the means is the cell and the carrier is the carrier according to the present invention, b. a detectable means capable of binding to the antibody captured by the carrier when the detectable means is contacted with the carrier, wherein the detectable means is preferably a labeled secondary antibody capable of binding to the autoantibody captured on the carrier, c. optionally a means for removing any sample from the carrier and the detectable means, preferably by washing:

d. a detecting device for detecting the presence of the detectable means and converting the results into an electrical signal, for example a fluorescence reader or a fluorescence microscope connected with a software capable of recognizing a pattern characteristic of a stained cell overexpressing a polypeptide comprising SEQ ID NO: 1 or a variant thereof in an image of the cell taken by the fluorescence reader or camera, and optionally a means for receiving the electronical signal from the detecting device and determining if the level of the signal is indicative of an increased likelihood of having or developing a disease, by comparing with the patterns characteristic of wild type or non-stained cells, preferably by a mock-transfected cell or cells not positively stained by an autoantibody binding specifically to a polypeptide having SEQ ID NO: 1 or a variant thereof on the same carrier, or an input reference value obtained with samples from healthy subjects or by comparing the level of signal obtained with one sample with the level of signal obtained with a second sample obtained at a later time point, preferably at least one month later.

According to the present invention, a device for removing an autoantibody to a polypeptide having SEQ ID NO: 1, preferably a complex comprising a polypeptide having SEQ ID NO: 1 and a polypeptide having SEQ ID NO: 2, from blood, preferably serum of an MN patient, wherein the device comprises a carrier coated with a polypeptide comprising SEQ ID NO: 1 or a variant thereof, preferably a complex comprising a polypeptide comprising SEQ ID NO: 1 and a polypeptide comprising SEQ ID NO: 2 or a variant thereof is provided as is an ex vivo method for removing an autoantibody to a polypeptide having SEQ ID NO: 1, preferably a complex comprising a polypeptide having SEQ ID NO: 1 and a polypeptide having SEQ ID NO: 2, from blood, preferably serum of an MN patient. A device coated with a polypeptide comprising SEQ ID NO: 1 or a variant thereof may be used or a device coated with a secondary antibody or protein capturing all IgG class antibodies, among them IgG class autoantibodies to a polypeptide having SEQ ID NO: 1. Suitable methods are described in Eisei Noiri and Noria Hanafusa, The Concise Manual of Apharesis Therapy, Springer Tokyo, 2014. Hamilton, P., Kanigicherla, D., Hanumapura, P., Walz, L., Kramer, D., Fischer, M., Brenchley, P., and Mitra, S. (2018) J. Clin. Aph. 33(3), 283-290. Another method is disclosed in EP3477300.

Sequences:

The present invention comprises a range of novel polypeptides, more specifically

```
[Exostosin 2]
                                                       SEQ ID NO: 1
MCASVKYNIRGPALIPRMKTKHRIYYITLFSIVLLGLIATGMFQFWPHSIESSNDWNVEKRSIR

DVPVVRLPADSPIPERGDLSCRMHTCFDVYRCGFNPKNKIKVYIYALKKYVDDFGVSVSNTI

SREYNELLMAISDSDYYTDDINRACLFVPSIDVLNQNTLRIKETAQAMAQLSRWDRGTNHLL

FNMLPGGPPDYNTALDVPRDRALLAGGGFSTWTYRQGYDVSIPVYSPLSAEVDLPEKGPG

PRQYFLLSSQVGLHPEYREDLEALQVKHGESVLVLDKCTNLSEGVLSVRKRCHKHQVFDYP

QVLQEATFCVVLRGARLGQAVLSDVLQAGCVPVVIADSYILPFSEVLDWKRASVVVPEEKM

SDVYSILQSIPQRQIEEMQRQARWFWEAYFQSIKAIALATLQIINDRIYPYAAISYEEWNDPPA

VKWGSVSNPLFLPLIPPQSQGFTAIVLTYDRVESLFRVITEVSKVPSLSKLLVVWNNQNKNPP

EDSLWPKIRVPLKVVRTAENKLSNRFFPYDEIETEAVLAIDDDIIMLTSDELQFGYEVWREFP

DRLVGYPGRLHLWDHEMNKWKYESEWTNEVSMVLTGAAFYHKYFNYLYTYKMPGDIKNW

VDAHMNCEDIAMNFLVANVTGKAVIKVTPRKKFKCPECTAIDGLSLDQTHMVERSECINKFA

SVFGTMPLKVVEHRADPVLYKDDFPEKLKSFPNIGSL

[Exostosin 1]
                                                       SEQ ID NO: 2
MQAKKRYFILLSAGSCLALLFYFGGLQFRASRSHSRREEHSGRNGLHHPSPDHFWPRFPD

ALRPFVPWDQLENEDSSVHISPRQKRDANSSIYKGKKCRMESCFDFTLCKKNGFKVYVYPQ

QKGEKIAESYQNILAAIEGSRFYTSDPSQACLFVLSLDTLDRDQLSPQYVHNLRSKVQSLHL

WNNGRNHLIFNLYSGTWPDYTEDVGFDIGQAMLAKASISTENFRPNFDVSIPLFSKDHPRTG

GERGFLKFNTIPPLRKYMLVFKGKRYLTGIGSDTRNALYHVHNGEDVVLLTTCKHGKDWQK

HKDSRCDRDNTEYEKYDYREMLHNATFCLVPRGRRLGSFRFLEALQAACVPVMLSNGWEL

PFSEVINWNQAAVIGDERLLLQIPSTIRSIHQDKILALRQQTQFLWEAYFSSVEKIVLTTLEIIQD

RIFKHISRNSLIWNKHPGGLFVLPQYSSYLGDFPYYYANLGLKPPSKFTAVIHAVTPLVSQSQ

PVLKLLVAAAKSQYCAQIIVLWNCDKPLPAKHRWPATAVPVVVIEGESKVMSSRFLPYDNIIT

DAVLSLDEDTVLSTTEVDFAFTVWQSFPERIVGYPARSHFWDNSKERWGYTSKWTNDYSM

VLTGAAIYHKYYHYLYSHYLPASLKNMVDQLANCEDILMNFLVSAVTKLPPIKVTQKKQYKET

MMGQTSRASRWADPDHFAQRQSCMNTFASWFGYMPLIHSQMRLDPVLFKDQVSILRKKY

RDIERL

[MN-related autoantigen PLA2R]
                                                       SEQ ID NO: 3
MLLSPSLLLLLLLGAPRGCAEGVAAALTPERLLEWQDKGIFVIQSESLKKCIQAGKSVLTLEN

CKQANKHMLWKWVSNHGLFNIGGSGCLGLNFSAPEQPLSLYECDSTLVSLRWRCNRKMIT

GPLQYSVQVAHDNTVVASRKYIHKWISYGSGGGDICEYLHKDLHTIKGNTHGMPCMFPFQY

NHQWHHECTREGREDDLLWCATTSRYERDEKWGFCPDPTSAEVGCDTIWEKDLNSHICY
```

-continued

```
QFNLLSSLSWSEAHSSCQMQGGTLLSITDETEENFIREHMSSKTVEVWMGLNQLDEHAGW
QWSDGTPLNYLNWSPEVNFEPFVEDHCGTFSSFMPSAWRSRDCESTLPYICKKYLNHIDH
EIVEKDAWKYYATHCEPGWNPYNRNCYKLQKEEKTWHEALRSCQADNSALIDITSLAEVEF
LVTLLGDENASETWIGLSSNKIPVSFEWSNDSSVIFTNWHTLEPHIFPNRSQLCVSAEQSEG
HWKVKNCEERLFYICKKAGHVLSDAESGCQEGWERHGGFCYKIDTVLRSFDQASSGYYCP
PALVTITNRFEQAFITSLISSVVKMKDSYFWIALQDQNDTGEYTWKPVGQKPEPVQYTHWNT
HQPRYSGGCVAMRGRHPLGRWEVKHCRHFKAMSLCKQPVENQEKAEYEERWPFHPCYL
DWESEPGLASCFKVFHSEKVLMKRTWREAEAFCEEFGAHLASFAHIEEENFVNELLHSKFN
WTEERQFWIGFNKRNPLNAGSWEWSDRTPVVSSFLDNTYFGEDARNCAVYKANKTLLPLH
CGSKREWICKIPRDVKPKIPFWYQYDVPWLFYQDAEYLFHTFASEWLNFEFVCSWLHSDLL
TIHSAHEQEFIHSKIKALSKYGASWWIGLQEERANDEFRWRDGTPVIYQNWDTGRERTVNN
QSQRCGFISSITGLWGSEECSVSMPSICKRKKVWLIEKKKDTPKQHGTCPKGWLYFNYKCL
LLNIPKDPSSWKNWTHAQHFCAEEGGTLVAIESEVEQAFITMNLFGQTTSVWIGLQNDDYET
WLNGKPVVYSNWSPFDIINIPSHNTTEVQKHIPLCALLSSNPNFHFTGKWYFEDCGKEGYGF
VCEKMQDTSGHGVNTSDMYPMPNTLEYGNRTYKIINANMTWYAAIKTCLMHKAQLVSITDQ
YHQSFLTVVLNRLGYAHWIGLFTTDNGLNFDWSDGTKSSFTFWKDEESSLLGDCVFADSN
GRWHSTACESFLQGAICHVPPETRQSEHPELCSETSIPWIKFKSNCYSFSTVLDSMSFEAAH
EFCKKEGSNLLTIKDEAENAFLLEELFAFGSSVQMVWLNAQFDGNNETIKWFDGTPTDQSN
WGIRKPDTDYFKPHHCVALRIPEGLWQLSPCQEKKGFICKMEADIHTAEALPEKGPSHSIIPL
AVVLTLIVIVAICTLSFCIYKHNGGFFRRLAGFRNPYYPATNFSTVYLEENILISDLEKSDQ

[MN-related autoantigen THSD7A]
                                               SEQ ID NO: 4
MGLQARRWASGSRGAAGPRRGVLQLLPLPLPLPLLLLLLLRPGAGRAAAQGEAEAPTLYLW
KTGPWGRCMGDECGPGGIQTRAVWCAHVEGWTTLHTNCKQAERPNNQQNCFKVCDWH
KELYDWRLGPWNQCQPVISKSLEKPLECIKGEEGIQVREIACIQKDKDIPAEDIICEYFEPKPL
LEQACLIPCQQDCIVSEFSAWSECSKTCGSGLQHRTRHVVAPPQFGGSGCPNLTEFQVCQ
SSPCEAEELRYSLHVGPWSTCSMPHSRQVRQARRRGKNKEREKDRSKGVKDPEARELIKK
KRNRNRQNRQENKYWDIQIGYQTREVMCINKTGKAADLSFCQQEKLPMTFQSCVITKECQV
SEWSEWSPCSKTCHDMVSPAGTRVRTRTIRQFPIGSEKECPEFEEKEPCLSQGDGVVPCA
TYGWRTTEWTECRVDPLLSQQDKRRGNQTALCGGGIQTREVYCVQANENLLSQLSTHKNK
EASKPMDLKLCTGPIPNTTQLCHIPCPTECEVSPWSAWGPCTYENCNDQQGKKGFKLRKR
RITNEPTGGSGVTGNCPHLLEAIPCEEPACYDWKAVRLGNCEPDNGKECGPGTQVQEVVCI
NSDGEEVDRQLCRDAIFPIPVACDAPCPKDCVLSTWSTWSSCSHTCSGKTTEGKQIRARSIL
AYAGEEGGIRCPNSSALQEVRSCNEHPCTVYHWQTGPWGQCIEDTSVSSFNTTTWNGEA
SCSVGMQTRKVICVRVNVGQVGPKKCPESLRPETVRPCLLPCKKDCIVTPYSDWTSCPSSC
KEGDSSIRKQSRHRVIIQLPANGGRDCTDPLYEEKACEAPQACQSYRWKTHKWRRCQLVP
WSVQQDSPGAQEGCGPGRQARAITCRKQDGGQAGIHECLQYAGPVPALTQACQIPCQDD
CQLTSWSKFSSCNGDCGAVRTRKRTLVGKSKKKEKCKNSHLYPLIETQYCPCDKYNAQPV
GNWSDCILPEGKVEVLLGMKVQGDIKECGQGYRYQAMACYDQNGRLVETSRCNSHGYIEE
ACIIPCSDCKLSEWSNWSRCSKSCGSGVKVRSKWLREKPYNGGRPCPKLDHVNQAQVY
EVVPCHSDCNQYLWVTEPWSICKVTFVNMRENCGEGVQTRKVRCMQNTADGPSEHVEDY
```

-continued

LCDPEEMPLGSRVCKLPCPEDCVISEWGPWTQCVLPCNQSSFRQRSADPIRQPADEGRSC

PNAVEKEPCNLNKNCYHYDYNVTDWSTCQLSEKAVCGNGIKTRMLDCVRSDGKSVDLKYC

EALGLEKNWQMNTSCMVECPVNCQLSDWSPWSECSQTCGLTGKMIRRRTVTQPFQGDG

RPCPSLMDQSKPCPVKPCYRWQYGQWSPCQVQEAQCGEGTRTRNISCVVSDGSADDFS

KVVDEEFCADIELIIDGNKNMVLEESCSQPCPGDCYLKDWSSWSLCQLTCVNGEDLGFGGI

QVRSRPVIIQELENQHLCPEQMLETKSCYDGQCYEYKWMASAWKGSSRTVWCQRSDGIN

VTGGCLVMSQPDADRSCNPPCSQPHSYCSETKTCHCEEGYTEVMSSNSTLEQCTLIPVVV

LPTMEDKRGDVKTSRAVHPTQPSSNPAGRGRTWFLQPFGPDGRLKTWVYGVAAGAFVLLI

FIVSMIYLACKKPKKPQRRQNNRLKPLTLAYDGDADM

[MN-related autoantigen NELL-1]
SEQ ID NO: 5
MPMDLILVVWFCVCTARTVVGFGMDPDLQMDIVTELDLVNTTLGVAQVSGMHNASKAFLFQ

DIEREIHAAPHVSEKLIQLFRNKSEFTILATVQQKPSTSGVILSIRELEHSYFELESSGLRDEIR

YHYIHNGKPRTEALPYRMADGQWHKVALSVSASHLLLHVDCNRIYERVIDPPDTNLPPGINL

WLGQRNQKHGLFKGIIQDGKIIFMPNGYITQCPNLNHTCPTCSDFLSLVQGIMDLQELLAKMT

AKLNYAETRLSQLENCHCEKTCQVSGLLYRDQDSWVDGDHCRNCTCKSGAVECRRMSCP

PLNCSPDSLPVHIAGQCCKVCRPKCIYGGKVLAEGQRILTKSCRECRGGVLVKITEMCPPLN

CSEKDHILPENQCCRVCRGHNFCAEGPKCGENSECKNWNTKATCECKSGYISVQGDSAYC

EDIDECAAKMHYCHANTVCVNLPGLYRCDCVPGYIRVDDFSCTEHDECGSGQHNCDENAI

CTNTVQGHSCTCKPGYVGNGTICRAFCEEGCRYGGTCVAPNKCVCPSGFTGSHCEKDIDE

CSEGIIECHNHSRCVNLPGWYHCECRSGFHDDGTYSLSGESCIDIDECALRTHTCWNDSAC

INLAGGFDCLCPSGPSCSGDCPHEGGLKHNGQVWTLKEDRCSVCSCKDGKIFCRRTACDC

QNPSADLFCCPECDTRVTSQCLDQNGHKLYRSGDNWTHSCQQCRCLEGEVDCWPLTCPN

LSCEYTAILEGECCPRCVSDPCLADNITYDIRKTCLDSYGVSRLSGSVWTMAGSPCTTCKCK

NGRVCCSVDFECLQNN

[MN-related autoantigen Semaphorin 3B]
SEQ ID NO: 6
MGRAGAAAVIPGLALLWAVGLGSAAPSPPRLRLSFQELQAWHGLQTFSLERTCCYQALLVD

EERGRLFVGAENHVASLNLDNISKRAKKLAWPAPVEWREECNWAGKDIGTECMNFVKLLH

AYNRTHLLACGTGAFHPTCAFVEVGHRAEEPVLRLDPGRIEDGKGKSPYDPRHRAASVLVG

EELYSGVAADLMGRDFTIFRSLGQRPSLRTEPHDSRWLNEPKFVKVFWIPESENPDDDKIYF

FFRETAVEAAPALGRLSVSRVGQICRNDVGGQRSLVNKWTTFLKARLVCSVPGVEGDTHFD

QLQDVFLLSSRDHRTPLLYAVFSTSSIFQGSAVCVYSMNDVRRAFLGPFAHKEGPMHQWV

SYQGRVPYPRPGMCPSKTFGTFSSTKDFPDDVIQFARNHPLMYNSVLPTGGRPLFLQVGA

NYTFTQIAADRVAAADGHYDVLFIGTDVGTVLKVISVPKGSRPSAEGLLLEELHVFEDSAAVT

SMQISSKRHQLYVASRSAVAQIALHRCAAHGRVCTECCLARDPYCAWDGVACTRFQPSAK

RRFRRQDVRNGDPSTLCSGDSSRPALLEHKVFGVEGSSAFLECEPRSLQARVEWTFQRAG

VTAHTQVLAEERTERTARGLLLRRLRRRDSGVYLCAAVEQGFTQPLRRLSLHVLSATQAER

LARAEEAAPAAPPGPKLWYRDFLQLVEPGGGGSANSLRMCRPQPALQSLPLESRRKGRNR

RTHAPEPRAERGPRSATHW

[Exostosin 2 with C-terminal His tag]
SEQ ID NO: 7
MCASVKYNIRGPALIPRMKTKHRIYYITLFSIVLLGLIATGMFQFWPHSIESSNDWNVEKRSIR

DVPVVRLPADSPIPERGDLSCRMHTCFDVYRCGFNPKNKIKVYIYALKKYVDDFGVSVSNTI

-continued

SREYNELLMAISDSDYYTDDINRACLFVPSIDVLNQNTLRIKETAQAMAQLSRWDRGTNHLL

FNMLPGGPPDYNTALDVPRDRALLAGGGFSTWTYRQGYDVSIPVYSPLSAEVDLPEKGPG

PRQYFLLSSQVGLHPEYREDLEALQVKHGESVLVLDKCTNLSEGVLSVRKRCHKHQVFDYP

QVLQEATFCVVLRGARLGQAVLSDVLQAGCVPVVIADSYILPFSEVLDWKRASVVVPEEKM

SDVYSILQSIPQRQIEEMQRQARWFWEAYFQSIKAIALATLQIINDRIYPYAAISYEEWNDPPA

VKWGSVSNPLFLPLIPPQSQGFTAIVLTYDRVESLFRVITEVSKVPSLSKLLVVWNNQNKNPP

EDSLWPKIRVPLKVVRTAENKLSNRFFPYDEIETEAVLAIDDDIIMLTSDELQFGYEVWREFP

DRLVGYPGRLHLWDHEMNKWKYESEWTNEVSMVLTGAAFYHKYFNYLYTYKMPGDIKNW

VDAHMNCEDIAMNFLVANVTGKAVIKVTPRKKFKCPECTAIDGLSLDQTHMVERSECINKFA

SVFGTMPLKVVEHRADPVLYKDDFPEKLKSFPNIGSLLEHHHHHHHH

[Exostosin 1 with C-terminal His tag]
SEQ ID NO: 8
MQAKKRYFILLSAGSCLALLFYFGGLQFRASRSHSRREEHSGRNGLHHPSPDHFWPRFPD

ALRPFVPWDQLENEDSSVHISPRQKRDANSSIYKGKKCRMESCFDFTLCKKNGFKVYVYPQ

QKGEKIAESYQNILAAIEGSRFYTSDPSQACLFVLSLDTLDRDQLSPQYVHNLRSKVQSLHL

WNNGRNHLIFNLYSGTWPDYTEDVGFDIGQAMLAKASISTENFRPNFDVSIPLFSKDHPRTG

GERGFLKFNTIPPLRKYMLVFKGKRYLTGIGSDTRNALYHVHNGEDVVLLTTCKHGKDWQK

HKDSRCDRDNTEYEKYDYREMLHNATFCLVPRGRRLGSFRFLEALQAACVPVMLSNGWEL

PFSEVINWNQAAVIGDERLLLQIPSTIRSIHQDKILALRQQTQFLWEAYFSSVEKIVLTTLEIIQD

RIFKHISRNSLIWNKHPGGLFVLPQYSSYLGDFPYYYANLGLKPPSKFTAVIHAVTPLVSQSQ

PVLKLLVAAAKSQYCAQIIVLWNCDKPLPAKHRWPATAVPVVVIEGESKVMSSRFLPYDNIIT

DAVLSLDEDTVLSTTEVDFAFTVWQSFPERIVGYPARSHFWDNSKERWGYTSKWTNDYSM

VLTGAAIYHKYYHYLYSHYLPASLKNMVDQLANCEDILMNFLVSAVTKLPPIKVTQKKQYKET

MMGQTSRASRWADPDHFAQRQSCMNTFASWFGYMPLIHSQMRLDPVLFKDQVSILRKKY

RDIERLLEHHHHHHHH

[Exostosin 2 fragment with C-terminal His tag]
SEQ ID NO: 9
SNDWNVEKRSIRDVPVVRLPADSPIPERGDLSCRMHTCFDVYRCGFNPKNKIKVYIY

ALKKYVDDFGVSVSNTISREYNELLMAISDSDYYTDDINRACLFVPSIDVLNQNTLRIK

ETAQAMAQLSRWDRGTNHLLFNMLPGGPPDYNTALDVPRDRALLAGGGFSTWTY

RQGYDVSIPVYSPLSAEVDLPEKGPGPRQYFLLSSQVGLHPEYREDLEALQVKHGE

SVLVLDKCTNLSEGVLSVRKRCHKHQVFDYPQVLQEATFCVVLRGARLGQAVLSDV

LQAGCVPVVIADSYILPFSEVLDWKRASVVVPEEKMSDVYSILQSIPQRQIEEMQRQ

ARWFWEAYFQSIKAIALATLQIINDRIYPYAAISYEEWNDPPAVKWGSVSNPLFLPLIP

PQSQGFTAIVLTYDRVESLFRVITEVSKVPSLSKLLVVWNNQNKNPPEDSLWPKIRV

PLKVVRTAENKLSNRFFPYDEIETEAVLAIDDDIIMLTSDELQFGYEVWREFPDRLVG

YPGRLHLWDHEMNKWKYESEWTNEVSMVLTGAAFYHKYFNYLYTYKMPGDIKNW

VDAHMNCEDIAMNFLVANVTGKAVIKVTPRKKFKCPECTAIDGLSLDQTHMVERSE

CINKFASVFGTMPLKVVEHRADPVLYKDDFPEKLKSFPNIGSLHHHHHH

[Exostosin 2 fragment]
SEQ ID NO: 10
SNDWNVEKRSIRDVPVVRLPADSPIPERGDLSCRMHTCFDVYRCGFNPKNKIKVYIY

ALKKYVDDFGVSVSNTISREYNELLMAISDSDYYTDDINRACLFVPSIDVLNQNTLRIK

```
-continued
ETAQAMAQLSRWDRGTNHLLFNMLPGGPPDYNTALDVPRDRALLAGGGFSTWTY

RQGYDVSIPVYSPLSAEVDLPEKGPGPRQYFLLSSQVGLHPEYREDLEALQVKHGE

SVLVLDKCTNLSEGVLSVRKRCHKHQVFDYPQVLQEATFCVVLRGARLGQAVLSDV

LQAGCVPVVIADSYILPFSEVLDWKRASVVVPEEKMSDVYSILQSIPQRQIEEMQRQ

ARWFWEAYFQSIKAIALATLQIINDRIYPYAAISYEEWNDPPAVKWGSVSNPLFLPLIP

PQSQGFTAIVLTYDRVESLFRVITEVSKVPSLSKLLVVWNNQNKNPPEDSLWPKIRV

PLKVVRTAENKLSNRFFPYDEIETEAVLAIDDDIIMLTSDELQFGYEVWREFPDRLVG

YPGRLHLWDHEMNKWKYESEWTNEVSMVLTGAAFYHKYFNYLYTYKMPGDIKNW

VDAHMNCEDIAMNFLVANVTGKAVIKVTPRKKFKCPECTAIDGLSLDQTHMVERSE

CINKFASVFGTMPLKVVEHRADPVLYKDDFPEKLKSFPNIGSL
```

The present invention is further illustrated by the following non-limiting examples from which further features, embodiments, aspects and advantages of the present invention may be taken.

FIGS. 1 to 4 show the detection of circulating autoantibodies using an immunofluorescence assay as described in the examples.

Figure 5:
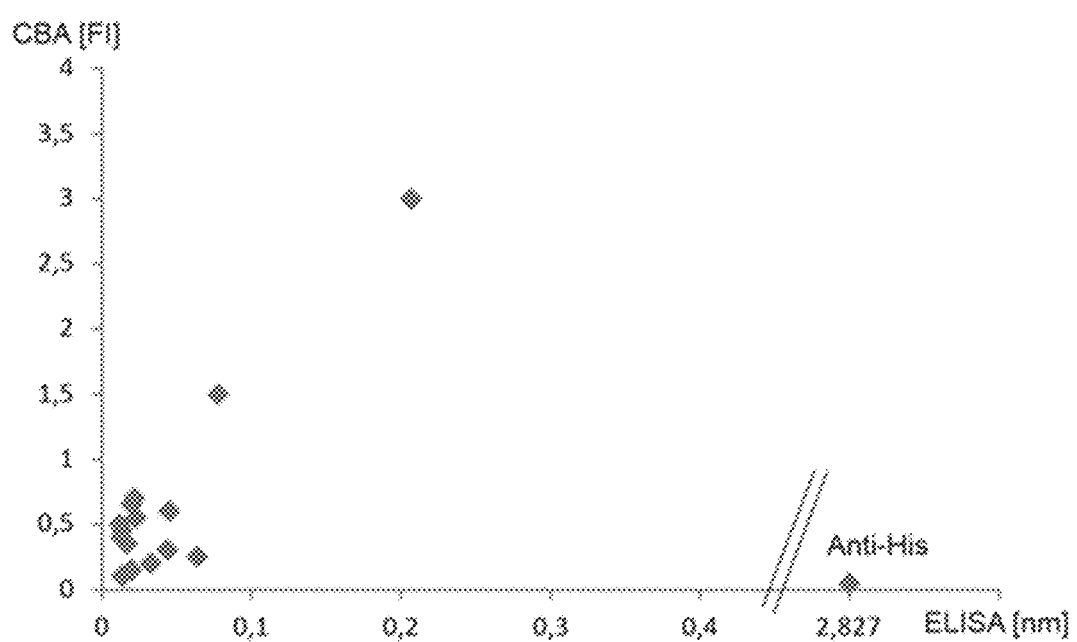
FIG. 5 shows the correlation of results obtained by immunofluorescence using the cell-based assay (CBA) as in Example 1 and the ELISA using a recombinant purified fragment of EXT2 as in Example 2. The fluorescence intensity (FI) and the absorption in nm (nm) as detected by ELISA is shown. Both experiments were carried out using two serum samples comprising autoantibodies to EXT2 as detected by CBA, which yield FI values of 1.5 and 3, respectively, 13 samples from healthy blood donors and an anti-His tag.

FIG. 5 shows the correlation of results obtained by immunofluorescence using the cell-based assay (CBA) as in Example 1 and the ELISA using a recombinant purified fragment of EXT2 as in Example 2. The fluorescence intensity (FI) and the absorption 20 in nm (nm) as detected by ELISA is shown. Both experiments were carried out using two serum samples comprising autoantibodies to EXT2 as detected by CBA, which yield FI values of 1.5 and 3, respectively, 13 samples from healthy blood donors and an anti-His tag.

A mock-transfected cell expressing no Exostosin (FIG. 1), a cell expressing EXT1 (FIG. 2), a cell expressing EXT2 (FIG. 3) and a cell expressing EXT2 and ETX1 (FIG. 4) is shown. Immunostained cells are marked using white arrows.

Example 1

HEK 293 Cells

Using comparative slides comprising fixed HEK 293 cells transiently transfected with an empty pTriEx-1 vector without insert (FIG. 1), pTriEx-1 vectors expressing EXT1 with and without His tag (SEQ ID NO: 2 and SEQ ID NO: 8) (FIG. 2), pTriEx-1 vector expressing EXT2 with and without His tag (SEQ ID NO: 1 and SEQ ID NO: 7) (FIG. 3), or both pTriEx-1 vectors expressing EXT1 and the pTriEx-1 vector expressing EXT2, each with and without His tag (FIG. 4), 296 samples from patients suspected of suffering from MN were analyzed. Antibodies to PLA2R and THSD7A had previously been shown to be absent in 185 of these samples using the Anti-PLA2R and Anti-THDSD7A IFT (IgG, product FA 1254-1001, EUROIMMUN, for the detection both of antibodies to PLA2R and THSD7A) from EUROIMMUN Medizinische Labordiagnostika AG. Antibodies to SEQ ID NO: 1, SEQ ID NO: 2, SEQ ID NO: 7 and SEQ ID NO: 8 were shown to be absent in 300 sera from healthy blood donors.

Cells were grown in DMEM medium comprising 10% heat inactivated fetal calf serum and 1% antibiotic-antimycotic (Invitrogen #15240) at 37° C. and 5% CO2. For the transient transfections the ExGen500 protocol (Catalog number 12783652, Thermo Fisher) was used. Fixed cells were prepared by contacting cells grown on microscopy slides with acetone by washing the cells in PBS followed by brief incubation in 100% acetone.

Methodology and Reagents

The methodology and reagents used were according to the manufacturer's instruction in the IIFT Neurology Mosaics (EUROIMMUN Medizinische Labordiagnostika AG, product number FA112d-1). The test system centers around the incubation of combinations of substrates with diluted patient sample. If the reaction is positive, specific antibodies of classes IgA, IgG and IgM attach to the antigens. In a second step, the attached antibodies are stained with FITC-labelled anti-human antibodies and made visible with a fluorescence microscope.

Briefly, human serum samples were diluted in PBS-Tween, followed by vortexing for 2 seconds. 30 µl sample per field was incubated for 30 minutes using the TITER-PLANE™ technology, followed by washing in PBS-Tween for 1 s, followed by incubation in PBS-Tween for 5 minutes in a cuvette for thorough washing. 25 µl of secondary antibody conjugate was then applied and incubated for 30 minutes using the TITERPLANE™ technology, followed by washing in PBS-Tween for 1 s, followed by incubation in PBS-Tween for 5 minutes in a cuvette for thorough washing.

After the incubations, the carrier with the fields was covered with up to 10 µl of mounting medium per field and a glass cover slide, followed by fluorescence microscopy analysis using a EUROSTAR microscope (EUROIMMUN Medizinische Labordiagnostika AG, Lubeck).

Figure 2:
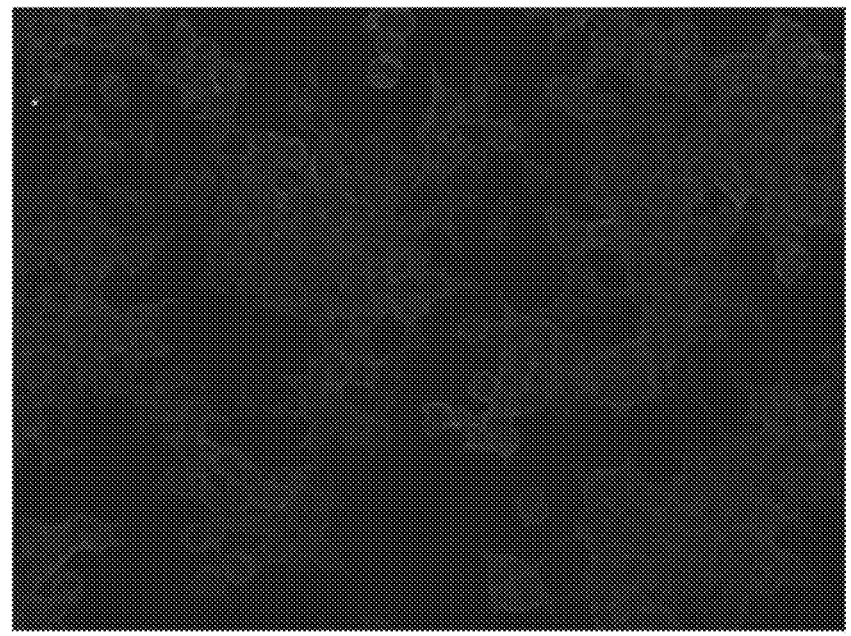
FIG. 2 shows the detection of circulating autoantibodies using an immunofluorescence assay. A cell expressing EXT1 is shown.
Figure 3:
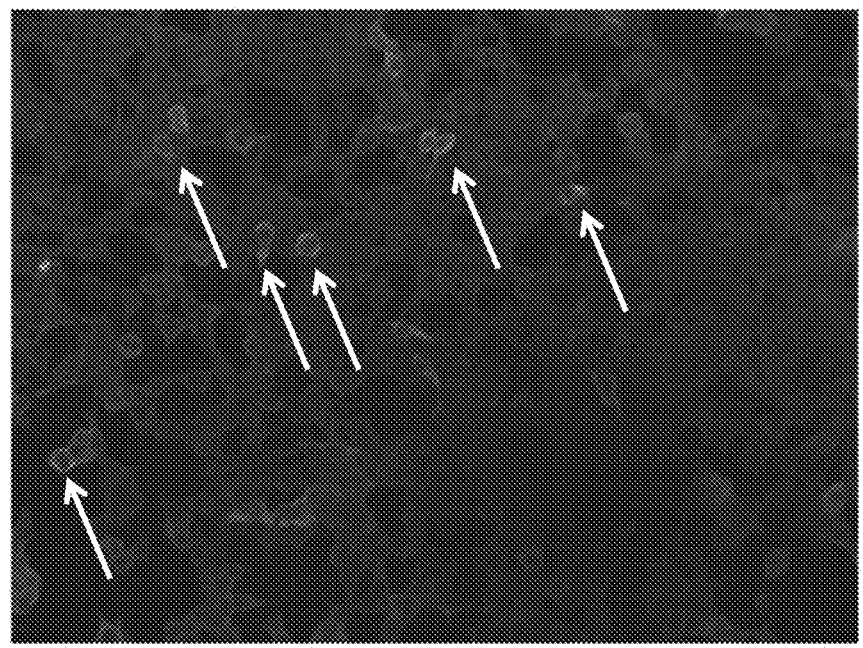
FIG. 3 shows the detection of circulating autoantibodies using an immunofluorescence assay. A cell expressing EXT2 is shown. Immunostained cells are marked using white arrows.
Figure 4:
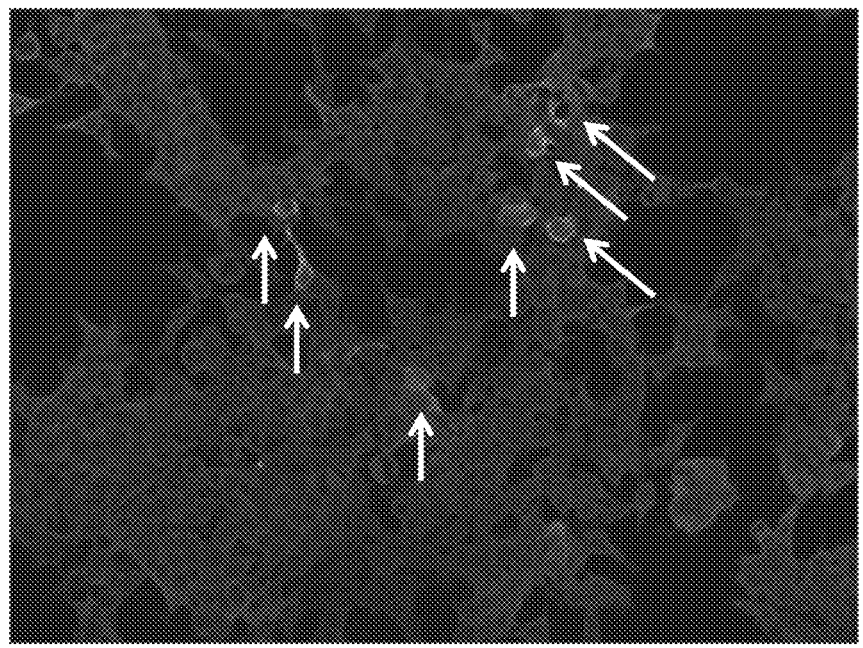
FIG. 4 shows the detection of circulating autoantibodies using an immunofluorescence assay. A cell expressing EXT2 and ETX1 is shown. Immunostained cells are marked using white arrows.

Results:

FIGS. 3 and 4, showing cells expressing EXT2 and EXT1/EXT2, respectively, showed a clear fluorescent signal which was absent if a cell expressing no Exostosin or EXT1 only is expressed (FIGS. 1 and 2).

Antibodies to SEQ ID NO: 1 could be detected in 1 out of 185 samples from PLA2R- and THSD7A-negative patients, but in none of the 111 samples from PLA2R- or THSD7A-positive patients. The autoantibody was not detected in any of 300 samples from healthy blood donors.

Therefore, it can be concluded that autoantibodies to EXT2 and autoantibodies to the complex comprising EXT2/EXT1 are associated with MN. Interestingly, such autoantibodies may not only be detected in histological samples as suggested by the inventors WO20037135, but occur in some patients as circulating autoantibodies in sera and can be detected using serological assays, contrary to the disclosure of WO20037135. It should be mentioned that native blotting was used by the inventors of WO20037135, which is generally a very sensitive method, not in the least because the structure of antigens used is not affected by exposure to harsh non-physiological conditions.

Since they occur in samples from patients in which autoantibodies to PLA2R and THSD7A are absent, they may be used to increase the overall sensitivity of serological investigations. Therefore, the number of patients who can be diagnosed absent results from the analysis of kidney biopsies, which can only be obtained using invasive surgery, is increased.

In a second run, Experiment 1 was repeated using a larger cohort of sera comprising 2147 samples, from patients suffering from MN or suspected of suffering from MN because of distinct clinical symptoms. Among these samples, two samples were found to comprise an autoantibody to SEQ ID NO: 1.

Example 2

For use in microtiter ELISA the purified protein was diluted in PBS to final concentrations of approximately 0.2 µg/ml human Exostosin 1/2 Heterodimer protein Arg29-Leu746 with a C-terminal 2-His and HA tag (EXT1) & Ser53-Leu718 with a C-terminal 6-His tag (SEQ ID NO: 9, R&D systems, product no. 8567-GT-020) and used to coat ELISA microtiter plates (Nunc, Roskilde, Denmark) overnight. Plates were incubated with 100 µl of protein each (2 h at room temperature), washed extensively and blocked using 0.1% (w/v) casein in PBS using standard methods.

Samples were diluted 1:101 in IgG sample buffer, applied to microtiter plates and incubated as described for commercial EUROIMMUN ELISA™ Test-Kits, using reagents commercially available (e.g. EI 2260-9601 G/A). The manual of EI 2260-9601 G/A was followed. An anti-his antibody (Merck Chemicals™, 70796-3) served as a positive control. In brief: 60 min at 37° C.; 3 washing steps using 200 µl washing buffer; addition of 100 µl of peroxidase-labelled anti-human IgG conjugate (rabbit) bzw. Anti-Mouse-IgG (H+L)-POD (Jackson Research; 115-035-062) (per well; incubation for 30 min at 37° C.; 3 washing steps using EUROIMMUN™ washing buffer; addition of 100 µl of chromogen/substrate solution (TMB/$H_2O_2$) per well; incubation for 30 min at room temperature; addition of 100 µl stop-solution (0.5 M sulfuric acid); measurement of optical density at 450 nm against 620 nm as a reference. Results below 0,065 were considered negative and results of more than 0,066 positive.

FIG. 5 shows the results with 13 samples from healthy blood donors and two samples identified as comprising autoantibodies to EXT2 by IFT as in example 2, compared to the results obtained using IFT.

It is clear that the two positive samples can be easily distinguished from samples from healthy subjects, demonstrating that ELISA based on a fragment of SEQ ID NO: 1 may be used to carry out the method according to the present invention as an alternative to the IFT described in example 1.

The invention claimed is:

1. A method for detecting an autoantibody to EXT2 or to a complex of EXT2 and EXT1 from a subject having or suspected of having membranous nephropathy, comprising:
    detecting the presence of an autoantibody binding specifically to a polypeptide having SEQ ID NO: 1 or to a complex comprising a polypeptide having SEQ ID NO: 1 and a polypeptide having SEQ ID NO: 2 or a variant thereof, in a liquid sample comprising antibodies from a subject having or suspected of having membranous nephropathy.

2. The method according to claim 1, wherein the detecting comprises employing a diagnostically useful carrier coated with a recombinant polypeptide comprising SEQ ID NO: 1 or a complex comprising a polypeptide comprising SEQ ID NO: 1 and a polypeptide comprising SEQ ID NO: 2, wherein the carrier is selected from the group consisting of a bead, a test strip, a microtiter plate, a membrane, a lateral flow device, a glass surface, a slide for microscopy, a microarray, and a biochip.

3. The method according to claim 2, wherein the diagnostically useful carrier further comprises one or more recombinant polypeptides selected from the group consisting of a polypeptide comprising SEQ ID NO: 2, a polypeptide comprising SEQ ID NO: 3, a polypeptide comprising SEQ ID NO: 4, a polypeptide comprising SEQ ID NO: 5, and a polypeptide comprising SEQ ID NO: 6.

4. The method according to claim 3, wherein any immobilized polypeptide is expressed by a cell immobilized on the diagnostically useful carrier or is a recombinant or isolated polypeptide immobilized on the carrier.

5. The method according to claim 4, wherein any immobilized polypeptide is expressed by a cell immobilized on the diagnostically useful carrier and the diagnostically useful carrier further comprises a mock-transfected cell.

6. The method according to claim 2, wherein an autoantibody binding specifically to SEQ ID NO: 1 is bound to the polypeptide comprising SEQ ID NO: 1 and optionally a secondary antibody comprising a label.

7. The method according to claim 1 wherein the detecting comprises employing a diagnostically useful carrier; and
    one or more components selected from the group consisting of means for detecting an autoantibody binding specifically to the polypeptide having SEQ ID NO: 1 or the complex, means for capturing an autoantibody binding specifically to the polypeptide having SEQ ID NO: 1 or to the complex, a washing buffer, a mounting medium, dilution buffer, a positive control, a negative control, a calibrator, and a recombinant polypeptide comprising SEQ ID NO: 1, optionally in complex with a polypeptide comprising SEQ ID NO: 2.

8. The method according to claim 1, wherein the sample is whole blood, serum, and/or plasma.

9. The method according to claim 1, further comprising:
    detecting the presence or absence of an autoantibody selected from the group consisting of an autoantibody binding specifically to an autoantibody binding specifically to a polypeptide having SEQ ID NO: 2, an autoantibody binding specifically to a polypeptide having SEQ ID NO: 3, an autoantibody binding specifically to a polypeptide having SEQ ID NO: 4, an autoantibody binding specifically to a polypeptide having SEQ ID NO: 5 and an autoantibody binding specifically to a polypeptide having SEQ ID NO: 6.

10. The method according to claim 1, further comprising removing an autoantibody to the polypeptide having SEQ ID NO: 1 or to the complex, from blood, with a device, wherein the device comprises:
    a carrier coated with the polypeptide comprising SEQ ID NO: 1 or the complex.

11. The method according to claim 1, further comprising an ex vivo method for removing an autoantibody to the polypeptide having SEQ ID NO: 1 or the complex, from blood, the method comprising:
    contacting the blood to a carrier coated with the polypeptide having SEQ ID NO: 1 or the complex.

12. The method according to claim 7, wherein the means for detecting the autoantibody binding specifically to the polypeptide having SEQ ID NO: 1 or to the complex is selected from the group consisting of a secondary antibody or the polypeptide comprising SEQ ID NO: 1.

13. The method according to claim 1, comprising detecting the presence or absence of an autoantibody binding specifically to a complex comprising a polypeptide having SEQ ID NO: 1 and a polypeptide having SEQ ID NO: 2.

14. The method according to claim 1, comprising detecting the presence or absence of an autoantibody binding specifically to SEQ ID NO: 1.

* * * * *